United States Patent
Guo et al.

(10) Patent No.: US 10,893,504 B2
(45) Date of Patent: Jan. 12, 2021

(54) PAGING METHOD AND APPARATUS

(71) Applicant: Huawei Technologies Co., Ltd., Guangdong (CN)

(72) Inventors: Yi Guo, Shenzhen (CN); Qinghai Zeng, Shanghai (CN); Mingzeng Dai, Shanghai (CN); Bo Lin, Beijing (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 15/844,362

(22) Filed: Dec. 15, 2017

(65) Prior Publication Data
US 2018/0110028 A1    Apr. 19, 2018

Related U.S. Application Data

(63) Continuation of application No. PCT/CN2015/081805, filed on Jun. 18, 2015.

(51) Int. Cl.
*H04W 68/00* (2009.01)
*H04W 68/02* (2009.01)
*H04W 64/00* (2009.01)

(52) U.S. Cl.
CPC ......... *H04W 68/02* (2013.01); *H04W 64/006* (2013.01); *H04W 68/00* (2013.01)

(58) Field of Classification Search
CPC ..... H04W 68/00; H04W 68/02; H04W 76/28; H04W 68/005; H04W 68/025;
(Continued)

(56) References Cited

U.S. PATENT DOCUMENTS 9,736,811 B1 *   8/2017   Sitaram ................. H04W 68/02
2003/0027574 A1 * 2/2003   Watanabe ............ H04W 60/00
                                                              455/435.1
(Continued)

FOREIGN PATENT DOCUMENTS

CN    101291516 A    10/2008
CN    101500216 A     8/2009
(Continued)

OTHER PUBLICATIONS

Mitsubishi Electric; "Velocity-optimised tracking areas"; 3GPP TSG RAN WG3 Meeting #51bis; R3-060492; Sophia-Antipolis, France; Apr. 3-5, 2006; 4 pages.

*Primary Examiner* — Daniel Lai
(74) *Attorney, Agent, or Firm* — Womble Bond Dickinson (US) LLP

(57) ABSTRACT

User equipment provides, to a network device, reference paging information generated according to a moving speed of the user equipment. The reference paging information is used by the network device to determine a paging area for sending a paging message. The network device receives the reference paging information generated by the user equipment according to the moving speed of the user equipment. The network device determines, according to the reference paging information, a paging area for sending a paging message to the user equipment. The network device sends, in the paging area, the paging message to the user equipment. The network device can determine the paging area according to the reference paging information, so that a paging resource waste in a paging process is reduced, relatively accurate paging is implemented, overheads of inter-network interfaces and air interfaces are greatly reduced, and system efficiency and stability are improved.

19 Claims, 9 Drawing Sheets

(58) Field of Classification Search
CPC ... H04W 68/12; H04W 68/04; H04W 64/006; H04W 4/021; H04W 4/70; H04W 36/0005; H04W 84/005; H04W 36/32; H04W 36/34; H04W 48/04; H04W 4/046; H04W 64/00; H04W 4/027; H04W 24/02; H04W 24/10; H04W 4/02; H04W 4/029; H04W 76/27; H04W 72/0406; H04W 36/36; H04W 60/04; H04W 36/08; H04W 48/20; H04W 52/0216; H04W 52/0251; H04W 64/003; H04W 72/0413; H04W 4/022; H04W 8/02; H04W 8/22; H04W 4/00

See application file for complete search history.

(56) References Cited

U.S. PATENT DOCUMENTS

| | | | |
|---|---|---|---|
| 2005/0014515 A1* | 1/2005 | Suzuki | H04W 36/32 455/456.1 |
| 2007/0104156 A1* | 5/2007 | Inoue | H04W 68/00 370/338 |
| 2007/0232321 A1* | 10/2007 | Casati | H04W 60/04 455/456.1 |
| 2008/0220782 A1* | 9/2008 | Wang | H04W 4/08 455/436 |
| 2009/0003285 A1* | 1/2009 | Mohanty | H04W 68/04 370/332 |
| 2010/0035633 A1 | 2/2010 | Park et al. | |
| 2010/0069088 A1* | 3/2010 | Fischer | H04W 60/04 455/456.1 |
| 2010/0211301 A1* | 8/2010 | McClellan | G08G 1/0104 701/119 |
| 2010/0298001 A1* | 11/2010 | Dimou | H04W 64/006 455/441 |
| 2011/0151842 A1* | 6/2011 | Olincy | H04M 3/42348 455/414.1 |
| 2011/0190010 A1 | 8/2011 | Cho | |
| 2014/0113666 A1* | 4/2014 | Arvidsson | H04W 68/02 455/458 |
| 2014/0171086 A1* | 6/2014 | Nakamori | H04W 36/0088 455/436 |
| 2014/0364155 A1* | 12/2014 | Iwai | H04W 68/04 455/458 |
| 2015/0016412 A1 | 1/2015 | Horn et al. | |
| 2015/0126235 A1 | 5/2015 | Cho et al. | |
| 2015/0146530 A1* | 5/2015 | Jung | H04W 24/10 370/235 |
| 2015/0215742 A1* | 7/2015 | Ikeda | H04W 4/029 455/456.1 |

FOREIGN PATENT DOCUMENTS

| | | |
|---|---|---|
| CN | 101627652 A | 1/2010 |
| CN | 102119539 A | 7/2011 |
| CN | 102143480 A | 8/2011 |
| CN | 103404215 A | 11/2013 |
| EP | 2355600 A1 | 8/2011 |
| EP | 2503834 A1 | 9/2012 |
| WO | 2008082193 A1 | 7/2008 |
| WO | WO-2015065041 A1 * | 5/2015 ............ H04W 68/02 |

* cited by examiner

PAGING METHOD AND APPARATUS

CROSS-REFERENCE TO RELATED APPLICATIONS

This application is a continuation of international application No. PCT/CN2015/081805, filed on Jun. 18, 2015, which is hereby incorporated by reference in its entirety.

TECHNICAL FIELD

This application relates to the field of wireless communications, and in particular, to a paging method and apparatus in a wireless communications system.

BACKGROUND

In a Long Term Evolution (LTE) system, a concept of a tracking area is defined. User equipment notifies an evolved packet core (EPC) of a current state of the user equipment by means of TA registration and update. When there is a need to page user equipment that is in an idle state, the EPC delivers a paging message in all cells of a TA in which the user equipment is located.

FIG. 1 is a flowchart of paging user equipment by a network device in an LTE system. The paging process includes the following steps.

101. A serving gateway (S-GW) receives downlink data.

102. When the user equipment is in an idle state, the S-GW sends a downlink data notification message to a mobility management entity (MME), so as to trigger the MME to page the user equipment.

103. The MME sends, according to tracking area information of the user equipment, a paging message to all evolved NodeBs (eNB) corresponding to a tracking area.

A correspondence between a TAI (tracking area identifier) and an eNB is configured on the MME, and the TAI includes a PLMN (an operator identifier) and a TAC (a tracking area identifier).

104. After receiving the paging message from the MME, an eNB sends the paging message in all cells of a tracking area in which the eNB is located.

105. After receiving the paging message, the user equipment initiates a service establishment request process, and establishes a connection to a network.

In addition, in a moving process of the user equipment, the user equipment performs TA update, so that the MME can learn a latest tracking area in which the user equipment is located. In this way, when performing paging, the MME performs paging in an entire updated tracking area.

Currently, a tracking area is usually quite large, and includes hundreds of base stations. The MME needs to send a message to each base station. This causes a severe waste of a capacity of an interface between the MME and a base station. Each base station needs to perform paging in a cell of the base station, and in cells of the hundreds of base stations, user equipment can be actually connected by means of paging in only one cell. This causes a severe waste of air interface resources.

Still further, currently, application of intelligent user equipment is quite popular, and a heartbeat packet of an intelligent application in a service period triggers a radio access network to deliver a large quantity of paging messages to user equipment. In addition, because instant messaging services such as WeChat and QQ are increasingly widely used, the radio access network is also triggered to deliver a large quantity of paging messages to the user equipment. For the radio access network, a huge challenge is presented to air interface resources and a paging message processing capability of a system. An air interface resource waste in the prior art may cause a lower connection speed or a connection failure for the user equipment.

In conclusion, because an existing manner in which the wireless communications system delivers a paging message has an inherent disadvantage, and as various intelligent applications on intelligent user equipment become popular, a new paging message delivering manner is urgently required in the art, so as to reduce consumption of air interface resources, inter-network interface resources, and processing capabilities of the system, thereby improving system efficiency and stability.

SUMMARY

Embodiments of the present disclosure provide a user equipment paging method and apparatus, so as to reduce consumption of system resources while implementing paging.

According to a first aspect, a paging method is provided, including:

providing, by user equipment to a network device, reference paging information generated according to a moving speed of the user equipment, where the reference paging information is used by the network device to determine a paging area for sending a paging message; and receiving, by the user equipment, the paging message sent in the paging area by the network device.

With reference to the first aspect, for the method, the reference paging information includes moving speed information of the user equipment, where the moving speed information of the user equipment includes a moving speed level of the user equipment, including a high speed, a medium speed, or a low speed; and/or the moving speed information of the user equipment includes a speed value of the user equipment; and/or the reference paging information includes a recommended paging area determined by the user equipment according to the moving speed and a location of a cell in which the user equipment is currently located.

With reference to the first aspect, for the method, the moving speed level is determined by the user equipment according to a quantity of cells passed through by the user equipment in a specified time.

With reference to the first aspect, for the method, when the user equipment passes through more than X cells in N minutes, the generated moving speed level is the high speed;

when the user equipment passes through X cells or cells less than X but more than Y in N minutes, the generated moving speed level is the medium speed; or when the user equipment passes through Y cells or less in N minutes, the generated moving speed level is the low speed, where N, X, and Y are positive integers, and X is greater than Y.

With reference to the first aspect, for the method, when the moving speed of the user equipment is greater than a specified speed threshold P, or the speed level is the high speed, the user equipment uses, as the recommended paging area, a tracking area in which the user equipment is currently located or A cells near the cell in which the user equipment is currently located;

when the moving speed of the user equipment is less than or equal to a specified speed threshold P, and is greater than a specified speed threshold Q, or the speed level is the medium speed, the user equipment uses, as the recommended paging area, B cells near the cell in which the user equipment is currently located; or when the moving speed of the user equipment is less than or equal to a specified speed threshold Q, or the speed level is the low speed, the user equipment uses, as the recommended paging area, C cells near the cell in which the user equipment is currently located, where A, B, and C are positive integers, A is greater than B, B is greater than C, and P is greater than Q.

With reference to the first aspect, for the method, when meeting one or a combination of the following conditions, the user equipment provides the reference paging information to the network device:

when receiving an indication that is sent by the network device and that instructs to provide the reference paging information, the user equipment generates and reports the reference paging information; and when meeting a reporting trigger condition, the user equipment generates and reports the reference paging information.

With reference to the first aspect, for the method, the reporting trigger condition is:

when the moving speed of the user equipment is greater than the specified speed threshold P, or the speed level is the high speed, the user equipment reports the reference paging information once when passing through D cells or one tracking area;

when the moving speed of the user equipment is less than or equal to the specified speed threshold P, and is greater than the specified speed threshold Q, or the speed level is the medium speed, the user equipment reports the reference paging information once when passing through E cells; or when the moving speed of the user equipment is less than or equal to the specified speed threshold Q, or the speed level is the low speed, the user equipment reports the reference paging information once when passing through F cells, where D, E, and F are positive integers, D is greater than E, E is greater than F, and P is greater than Q.

With reference to the first aspect, for the method, the network device is a core network device.

With reference to the first aspect, for the method, the reference paging information further includes any one or any combination of the following: the cell in which the user equipment is currently located, a neighboring cell list, or a current moving direction of the user equipment.

According to a second aspect, a paging method is provided, including:

receiving, by a network device, reference paging information generated by user equipment according to a moving speed of the user equipment;

determining, by the network device according to the reference paging information, a paging area for sending a paging message to the user equipment; and sending, in the paging area by the network device, the paging message to the user equipment.

With reference to the second aspect, for the method, the reference paging information includes moving speed information of the user equipment, where the moving speed information of the user equipment includes a moving speed level of the user equipment, including a high speed, a medium speed, or a low speed; and/or the moving speed information of the user equipment includes a speed value of the user equipment; and the determining, by the network device according to the reference paging information, a paging area for sending a paging message to the user equipment includes: determining the paging area according to the moving speed information and a location of a cell in which the user equipment is currently located; and/or the reference paging information includes a recommended paging area determined by the user equipment according to the moving speed and the location of the cell in which the user equipment is currently located; and the determining, by the network device according to the reference paging information, a paging area for sending a paging message to the user equipment includes: using the recommended paging area as the paging area.

With reference to the second aspect, for the method, the moving speed level is determined by the user equipment according to a quantity of cells passed through by the user equipment in a specified time.

With reference to the second aspect, for the method, when the user equipment passes through more than X cells in N minutes, the moving speed level is the high speed;

when the user equipment passes through X cells or cells less than X but more than Y in N minutes, the moving speed level is the medium speed; or when the user equipment passes through Y cells or less in N minutes, the moving speed level is the low speed, where N, X, and Y are positive integers, and X is greater than Y.

With reference to the second aspect, for the method, when the moving speed of the user equipment is greater than a specified speed threshold P, or the speed level is the high speed, the user equipment uses, as the recommended paging area, a tracking area in which the user equipment is currently located or A cells near the cell in which the user equipment is currently located;

when the moving speed of the user equipment is less than or equal to a specified speed threshold P, and is greater than a specified speed threshold Q, or the speed level is the medium speed, the user equipment uses, as the recommended paging area, B cells near the cell in which the user equipment is currently located; or when the moving speed of the user equipment is less than or equal to a specified speed threshold Q, or the speed level is the low speed, the user equipment uses, as the recommended paging area, C cells near the cell in which the user equipment is currently located, where A, B, and C are positive integers, A is greater than B, B is greater than C, and P is greater than Q.

With reference to the second aspect, for the method, the reference paging information received by the network device includes at least one of the following:

the reference paging information that is received by the network device and that is reported by the user equipment when receiving an indication that is sent by the network device and that instructs to provide the reference paging information; or the reference paging information that is received by the network device and that is reported by the user equipment when meeting a reporting trigger condition.

With reference to the second aspect, for the method, the reporting trigger condition is:

when the moving speed of the user equipment is greater than the specified speed threshold P, or the speed level is the high speed, the user equipment reports the reference paging information once when passing through D cells or one tracking area;

when the moving speed of the user equipment is less than or equal to the specified speed threshold P, and is greater than the specified speed threshold Q, or the speed level is the medium speed, the user equipment reports the reference paging information once when passing through E cells; or when the moving speed of the user equipment is less than or equal to the specified speed threshold Q, or the speed level is the low speed, the user equipment reports the reference paging information once when passing through F cells, where D, E, and F are positive integers, D is greater than E, E is greater than F, and P is greater than Q.

With reference to the second aspect, for the method, the network device is a core network device.

With reference to the second aspect, for the method, the reference paging information further includes any one or any combination of the following: the cell in which the user equipment is currently located, a neighboring cell list, or a current moving direction of the user equipment.

With reference to the second aspect, for the method, the determining, by the network device, the paging area according to the moving speed information and a location of a cell in which the user equipment is currently located includes:

when the moving speed reported by the user equipment is greater than a specified speed threshold P', or the reported speed level is the high speed, determining, as the paging area by the network device, a tracking area in which the user equipment is currently located or A' cells near the cell in which the user equipment is currently located;

when the moving speed reported by the user equipment is less than or equal to a specified speed threshold P', and is greater than a specified speed threshold Q', or the reported speed level is the medium speed, determining, as the paging area by the network device, B' cells near the cell in which the user equipment is currently located; or when the moving speed reported by the user equipment is less than or equal to a specified speed threshold Q', or the reported speed level is the low speed, determining, as the paging area by the network device, C' cells near the cell in which the user equipment is currently located, where A', B', and C' are positive integers, A' is greater than B', B' is greater than C', and P' is greater than Q'.

According to a third aspect, user equipment is provided, including:

a processing unit, configured to generate reference paging information according to a moving speed of the user equipment;

a sending unit, configured to send the reference paging information generated by the processing unit to a network device, where the reference paging information is used by the network device to determine a paging area for sending a paging message; and a receiving unit, configured to receive the paging message sent in the paging area by the network device.

With reference to the third aspect, for the user equipment, the reference paging information includes moving speed information of the user equipment, where the moving speed information of the user equipment includes a moving speed level of the user equipment, including a high speed, a medium speed, or a low speed; and/or the moving speed information of the user equipment includes a speed value of the user equipment; and/or the reference paging information includes a recommended paging area determined by the user equipment according to the moving speed and a location of a cell in which the user equipment is currently located.

With reference to the third aspect, for the user equipment, the processing unit is configured to determine the moving speed level according to a quantity of cells passed through by the user equipment in a specified time.

With reference to the third aspect, for the user equipment, the processing unit is configured to:

when the user equipment passes through more than X cells in N minutes, determine that the moving speed level is the high speed;

when the user equipment passes through X cells or cells less than X but more than Y in N minutes, determine that the moving speed level is the medium speed; or when the user equipment passes through Y cells or less in N minutes, determine that the moving speed level is the low speed, where N, X, and Y are positive integers, and X is greater than Y.

With reference to the third aspect, for the user equipment, the processing unit is configured to:

when the moving speed of the user equipment is greater than a specified speed threshold P, or the speed level is the high speed, use, as the recommended paging area, a tracking area in which the user equipment is currently located or A cells near the cell in which the user equipment is currently located;

when the moving speed of the user equipment is less than or equal to a specified speed threshold P, and is greater than a specified speed threshold Q, or the speed level is the medium speed, use, as the recommended paging area, B cells near the cell in which the user equipment is currently located; or when the moving speed of the user equipment is less than or equal to a specified speed threshold Q, or the speed level is the low speed, use, as the recommended paging area, C cells near the cell in which the user equipment is currently located, where A, B, and C are positive integers, A is greater than B, B is greater than C, and P is greater than Q.

With reference to the third aspect, for the user equipment, the receiving unit is further configured to receive an indication that is sent by the network device and that instructs to provide the reference paging information; and the processing unit is configured to: after the receiving unit receives the indication, generate the reference paging information; and/or the processing unit is configured to: when the user equipment meets a reporting trigger condition, generate the reference paging information.

With reference to the third aspect, for the user equipment, the reporting trigger condition is:

when the moving speed of the user equipment is greater than the specified speed threshold P, or the speed level is the high speed, the user equipment reports the reference paging information once when passing through D cells or one tracking area);

when the moving speed of the user equipment is less than or equal to the specified speed threshold P, and is greater than the specified speed threshold Q, or the speed level is the medium speed, the user equipment reports the reference paging information once when passing through E cells; or when the moving speed of the user equipment is less than or equal to the specified speed threshold Q, or the speed level is the low speed, the user equipment reports the reference paging information once when passing through F cells, where D, E, and F are positive integers, D is greater than E, E is greater than F, and P is greater than Q.

With reference to the third aspect, for the user equipment, the reference paging information further includes any one or any combination of the following: the cell in which the user equipment is currently located, a neighboring cell list, or a current moving direction of the user equipment.

According to a fourth aspect, a network device is provided, including:

a receiving unit, configured to receive reference paging information that is sent by user equipment and that is generated according to a moving speed of the user equipment;

a processing unit, configured to determine, according to the reference paging information, a paging area for sending a paging message to the user equipment; and a sending unit, configured to send, in the paging area, the paging message to the user equipment.

With reference to the fourth aspect, for the network device, the reference paging information includes moving speed information of the user equipment, where the moving speed information of the user equipment includes a moving speed level of the user equipment, including a high speed, a medium speed, or a low speed; and/or the moving speed information of the user equipment includes a speed value of the user equipment; and the processing unit is configured to determine the paging area according to the moving speed information and a location of a cell in which the user equipment is currently located; and/or the reference paging information includes a recommended paging area determined by the user equipment according to the moving speed and the location of the cell in which the user equipment is currently located; and the processing unit is configured to use the recommended paging area as the paging area.

With reference to the fourth aspect, for the network device, the moving speed level is determined by the user equipment according to a quantity of cells passed through by the user equipment in a specified time.

With reference to the fourth aspect, for the network device, when the user equipment passes through more than X cells in N minutes, the moving speed level is the high speed;

when the user equipment passes through X cells or cells less than X but more than Y in N minutes, the moving speed level is the medium speed; or when the user equipment passes through Y cells or less in N minutes, the moving speed level is the low speed, where N, X, and Y are positive integers, and X is greater than Y.

With reference to the fourth aspect, for the network device, the sending unit is further configured to send, to the user equipment, an indication that instructs to provide the reference paging information; and/or the sending unit is further configured to send a reporting trigger condition to the user equipment.

With reference to the fourth aspect, for the network device, the reporting trigger condition is:

when the moving speed of the user equipment is greater than a specified speed threshold P, or the speed level is the high speed, the user equipment reports the reference paging information once when passing through D cells or one tracking area;

when the moving speed of the user equipment is less than or equal to a specified speed threshold P, and is greater than a specified speed threshold Q, or the speed level is the medium speed, the user equipment reports the reference paging information once when passing through E cells; or when the moving speed of the user equipment is less than or equal to a specified speed threshold Q, or the speed level is the low speed, the user equipment reports the reference paging information once when passing through F cells, where D, E, and F are positive integers, D is greater than E, E is greater than F, and P is greater than Q.

With reference to the fourth aspect, for the network device, the reference paging information further includes any one or any combination of the following: the cell in which the user equipment is currently located, a neighboring cell list, or a current moving direction of the user equipment.

With reference to the fourth aspect, for the network device, the processing unit is configured to:

when the moving speed reported by the user equipment is greater than a specified speed threshold P', or the reported speed level is the high speed, determine, as the paging area, a tracking area in which the user equipment is currently located or A' cells near the cell in which the user equipment is currently located;

when the moving speed reported by the user equipment is less than or equal to a specified speed threshold P', and is greater than a specified speed threshold Q', or the reported speed level is the medium speed, determine, as the paging area, B' cells near the cell in which the user equipment is currently located; or when the moving speed reported by the user equipment is less than or equal to a specified speed threshold Q', or the reported speed level is the low speed, determine, as the paging area, C' cells near the cell in which the user equipment is currently located, where A', B', and C' are positive integers, A' is greater than B', B' is greater than C', and P' is greater than Q'.

With reference to the fourth aspect, the network device is a core network device.

According to the paging method in the embodiments of the present disclosure, when meeting the condition, the user equipment in a wireless communications system provides, to the network device, the reference paging information generated according to the moving speed of the user equipment, and the network device can determine the paging area according to the reference paging information, and perform paging in the paging area. In addition, the paging area determined by the network device is related to the speed of the user equipment. This is different from the prior art in which paging is always performed in an entire tracking area. Therefore, a paging resource waste in a paging process is reduced, relatively accurate paging is implemented, overheads of inter-network interfaces and air interfaces are greatly reduced, and system efficiency and stability are improved.

BRIEF DESCRIPTION OF DRAWINGS

To describe the technical solutions in the embodiments of the present disclosure more clearly, the following briefly describes the accompanying drawings required for describing the embodiments. Apparently, the accompanying drawings in the following description show merely some embodiments of the present disclosure, and a person of ordinary skill in the art may still derive other drawings from these accompanying drawings without creative efforts.

DESCRIPTION OF EMBODIMENTS

Although description is given in the foregoing background by using an LTE system as an example, a person skilled in the art should understand that the present disclosure is applicable not only to the LTE system, but also to another wireless communications system such as a GSM, a UMTS, CDMA, and a new network system.

For example, in the LTE system, an network access device is an eNB, and a core network device is an MME. In the UMTS system, an network access device is an RNC, and a core network device is an SGSN. In another wireless communications system, there are also a corresponding network access device and a corresponding core network device. In the following embodiments, the network access device and the core network device are collectively referred to as a network device relative to user equipment.

A person skilled in the art should understand that the user equipment in the present disclosure may be a device such as a user terminal, a terminal device, and a mobile station.

Embodiment 1

A concept of this embodiment is that user equipment reports related information of the user equipment to a network device. After learning the related information of the user equipment, the network device determines a paging area according to the related information.

The network device may be a base station, or may be a core network device. A location in which a component performing a paging operation is located may vary according to a network architecture. For example, in an LTE system, a core network device is an MME, and the MME completes the paging operation. In this case, the network device is a core network device. However, in some wireless communications systems, the component completing the paging operation may not be in the core network device, and may be located in an network access device, and the network access device completes the paging operation. In this case, the network device is an network access device such as abase station. In addition, in this case, among several common base stations, there usually is only one special base station that can perform a paging area determining operation. Therefore, a base station that receives the related information of the user equipment and a base station that determines the paging area are usually not a same base station. The following gives respective descriptions.

Figure 1:
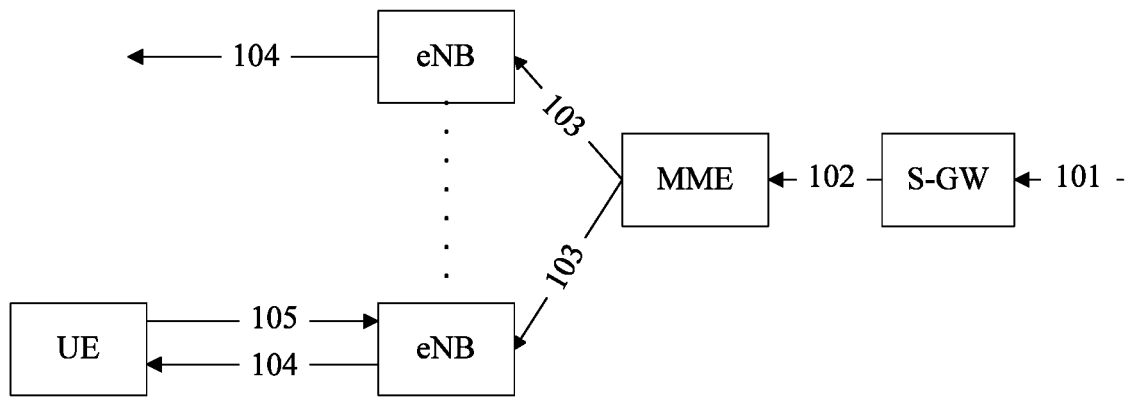
FIG. 1 is a schematic flowchart of paging in the prior art.
Figure 2:
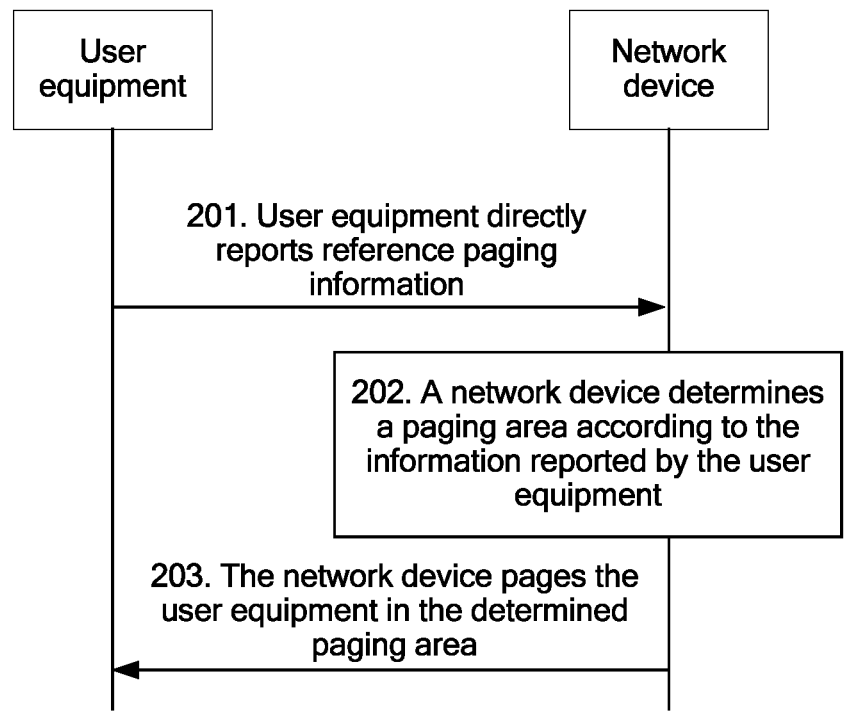
FIG. 2 is a schematic flowchart of a first paging method according to Embodiment 1 of the present disclosure.

The following describes the technical solution in Embodiment 1 of the present disclosure with reference to FIG. 2.

Specifically, the network devices in the embodiment of FIG. 2 may be core network devices, and the core network devices complete a paging operation. In this implementation, the network devices are usually a same core network device. The following mainly uses one core network device as an example for description. The network device is a core network device to which a base station in a cell in which user equipment is currently located is connected.

Step 201: User equipment provides, to a network device, reference paging information generated according to a moving speed of the user equipment, where the reference paging information is used by the network device to determine a paging area for sending a paging message.

Step 202: The network device determines a paging area according to the reference paging information reported by the user equipment.

Step 203: The network device pages the user equipment in the paging area determined in step 202.

In step 201, the user equipment may report the reference paging information by using a message transmission path of a wireless communications network. Specifically, the user equipment may report the reference paging information to the core network device by using a base station in a cell in which the user equipment is currently located. If the user equipment attempts to transmit the information about the user equipment to an network access device such as a base station, the user equipment may perform transmission by using an access stratum message. If the user equipment attempts to transmit the information about the user equipment to a core network device, the user equipment may perform transmission by using a non-access stratum message. During transmission by using the non-access stratum message, for example, when changing a tracking area in a moving process, the user equipment performs TA update (tracking area update). In this case, the reference paging information is reported, so as to notify the network device of the reference paging information by using a tracking area update message. Alternatively, during power-on attachment, the user equipment reports the reference paging information, so as to notify the network device of the reference paging information by using a power-on attachment message.

The reference paging information notified by the user equipment to the network device is used by the network device to determine the paging area for sending the paging message.

The reference paging information may include moving speed information of the user equipment, where the moving speed information of the user equipment may include a moving speed level of the user equipment, for example, a high speed, a medium speed, or a low speed; and/or a speed value of the user equipment; and/or the reference paging information may include a recommended paging area determined by the user equipment according to the moving speed of the user equipment and a location of a cell in which the user equipment is currently located.

In addition, the reference paging information may further include the cell in which the user equipment is currently located, a neighboring cell list, and/or the like.

When assessing a level of the speed of the user equipment, the user equipment may perform determining by using a quantity of cells that are passed through by the user equipment in a unit time. That is, a larger quantity of cells that are passed through by the user equipment in the unit time indicates a higher assessed speed of the user equipment, and vice versa. A specific assessment manner may be: When the user equipment passes through more than X cells in N minutes, the generated moving speed level is the high speed; when the user equipment passes through X cells or cells less than X but more than Y in N minutes, the generated moving speed level is the medium speed; or when the user equipment passes through Y cells or less in N minutes, the generated moving speed level is the low speed, where N, X, and Y are positive integers, and X is greater than Y. Specific speed assessment thresholds are set as follows: N=1, X=10, and Y=1.

Specifically, a speed value of the user equipment may be assessed in a user equipment speed measurement manner in the prior art. For example, a GPS module of the user equipment is used to obtain a current speed value of the user equipment.

The user equipment recommends, according to the speed of the user equipment and the location of the cell in which the user equipment is located, the recommended paging area to the network device for paging. A higher speed of the user equipment indicates a larger recommended paging area, and a lower speed of the user equipment indicates a smaller recommended paging area. For example, when the moving speed of the user equipment is greater than a specified speed threshold P, or the speed level is the high speed, the user equipment uses, as the recommended paging area, a tracking area in which the user equipment is currently located or A cells near the cell in which the user equipment is currently located; when the moving speed of the user equipment is less than or equal to a specified speed threshold P, and is greater than a specified speed threshold Q, or the speed level is the medium speed, the user equipment uses, as the recommended paging area, B cells near the cell in which the user equipment is currently located; or when the moving speed of the user equipment is less than or equal to a specified speed threshold Q, or the speed level is the low speed, the user equipment uses, as the recommended paging area, C cells near the cell in which the user equipment is currently located, where A, B, and C are positive integers, A is greater than B, B is greater than C, and P is greater than Q. Specific values for the recommended paging area are set as follows: A=20, B=10, C=1, P=60 km/h, and Q=3 km/h. Certainly, determining may also be performed with reference to the foregoing speed threshold and speed level, that is, a corresponding recommended paging area is determined only when the speed of the user equipment meets conditions about the speed threshold and the speed level. With reference to the foregoing embodiment, a person skilled in the art may easily learn a specific implementation, and therefore details are not described herein. The same rule is true for another embodiment, and details are not described herein again.

Optionally, the reference paging information reported by the user equipment may further include a current moving direction of the user equipment. The moving direction may be assessed while the user equipment assesses the level of the speed of the user equipment. For example, the current moving direction of the user equipment is determined according to a path of cells that are passed through by the user equipment, or the current moving direction of the user equipment may be obtained by using the GPS module of the user equipment. Correspondingly, when recommending the paging area to the network device, in addition to considering the speed information of the user equipment and location information of the cell in which the user equipment is located, the user equipment may further consider the moving direction of the user equipment. For example, a cell range in a possible future direction of the user equipment is recommended as the recommended paging area according to the moving direction of the user equipment, and a cell in a direction opposite to the moving direction of the user equipment is not selected. In a case of a higher speed of the user equipment, a cell that is farther from the current cell and that is in the moving direction of the user equipment is selected as the recommended paging area. In a case of a lower speed of the user equipment, a cell that is closer to the current cell and that is in the moving direction of the user equipment is selected as the recommended paging area.

In step 202, the core network device may learn information about the cell in which the user equipment is located or a neighboring cell from the network access device, or the reference paging information reported by the user equipment to the network device may include information such as information about the cell in which the user equipment is located and/or the neighboring cell. Regardless of which manner is used, the network device may obtain the information about the cell in which the user equipment is currently located and the information about the neighboring cell.

After learning the reference paging information of the user equipment, the network device may determine the paging area according to the reference paging information. If the reference paging information reported by the user equipment to the network device includes the speed information of the user equipment, the network device may determine the paging area according to the speed information of the user equipment and the location information of the cell in which the user equipment is located. If the reference paging information reported by the user equipment to the network device includes the recommended paging area recommended by the user equipment for paging, for example, a cell list or a TA list, the network device may set the recommended paging area reported by the user equipment as the paging area. If the reference paging information reported by the user equipment to the network device includes both the speed information of the user equipment and the recommended paging area, the network device may select one from or combine a paging area determined according to the speed information of the user equipment and the paging area recommended by the user equipment, so as to determine a final paging area. Specifically, if two obtained areas are different, an area with more cells may be selected as the paging area, or a total area obtained by combining the two areas is selected as the paging area. A person skilled in the art may perform selection according to a specific application case, and details are not described herein.

A manner in which the network device determines the paging area according to the speed information of the user equipment and the location information of the cell in which the user equipment is located may be similar to a manner in which the user equipment recommends the paging area to the network device according to the speed information of the user equipment and the location of the cell in which the user equipment is located. Specifically, when the moving speed reported by the user equipment is greater than a specified speed threshold P', or the reported speed level is the high speed, the network device determines, as the paging area, a tracking area in which the user equipment is currently located or A' cells near the cell in which the user equipment is currently located; when the moving speed reported by the user equipment is less than or equal to a specified speed threshold P', and is greater than a specified speed threshold Q', or the reported speed level is the medium speed, the network device determines, as the paging area, B' cells near the cell in which the user equipment is currently located; or when the moving speed reported by the user equipment is less than or equal to a specified speed threshold Q', or the reported speed level is the low speed, the network device determines, as the paging area, C' cells near the cell in which the user equipment is currently located, where A', B', and C' are positive integers, A' is greater than B', B' is greater than C', and P' is greater than Q'. Specific values for the selective paging area are set as follows: A'=20, B'=10, C'=1, P'=60 km/h, and Q'=3 km/h.

Optionally, if the reference paging information reported by the user equipment further includes the moving direction of the user equipment, the network device further needs to consider the moving direction of the user equipment when determining the paging area. A specific determining manner is similar to the manner in which the user equipment reports the recommended paging area. For example, a cell range in a possible future direction of the user equipment is preferably determined as the paging area according to the moving direction of the user equipment, and a cell in a direction opposite to the moving direction of the user equipment is not selected. In a case of a higher speed of the user equipment, a cell that is farther from the current cell and that is in the moving direction of the user equipment is determined as the paging area. In a case of a lower speed of the user equipment, a cell that is closer to the current cell and that is in the moving direction of the user equipment is determined as the paging area.

In step 203, the core network device may page the user equipment by using a base station corresponding to the paging area.

Certainly, in some cases, two core network devices may cooperate for processing. A person of ordinary skill in the art may understand that, in this manner, processing may be completed by means of interaction between the two core network devices.

Figure 3:
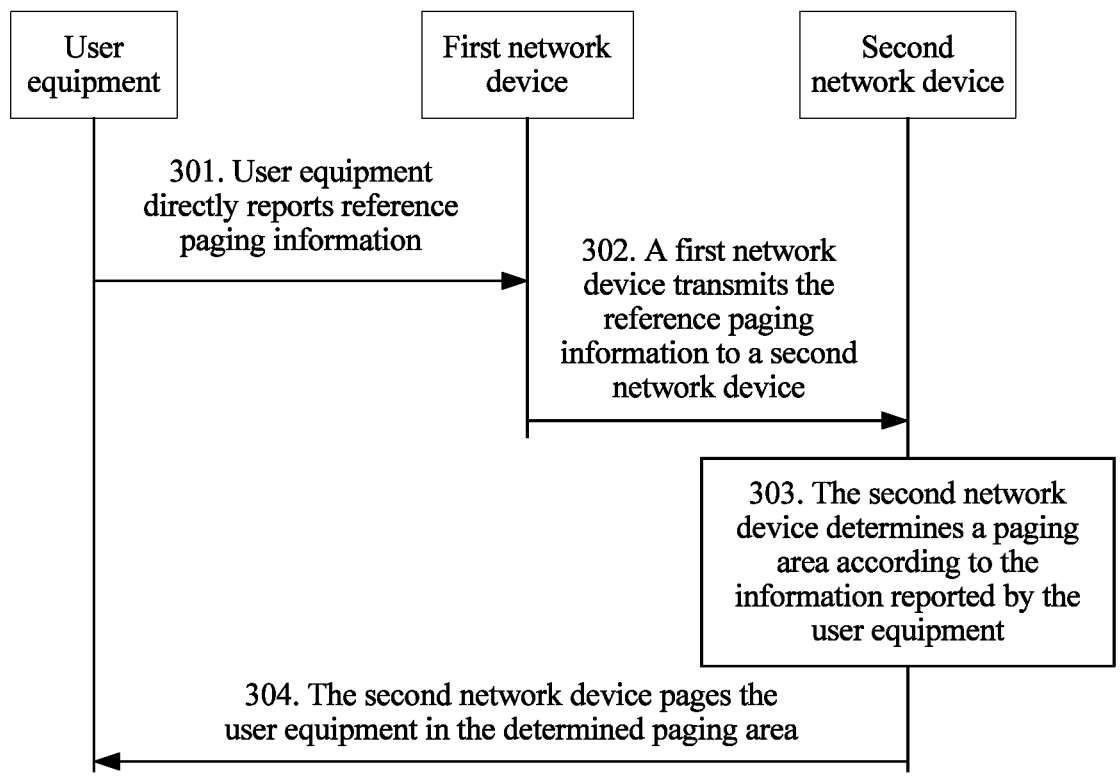
FIG. 3 is a schematic flowchart of a second paging method according to Embodiment 1 of the present disclosure.

The following describes the technical solution in Embodiment 1 of the present disclosure with reference to FIG. 3.

Specifically, in an embodiment of FIG. 3, a base station completes a paging operation. A network device in this embodiment generally includes two network devices, for example, includes a first network device and a second network device. The two network devices may be base stations. The first network device is generally a base station in a cell in which user equipment is currently located, but the base station in the cell in which the user equipment is currently located, that is, the first network device, may not be a base station that can perform a paging area determining operation. In this case, the base station needs to send reference paging information to a special base station that can perform a paging area determining operation, and the special base station determines a paging area. In this case, the second network device is the special base station.

The embodiment in FIG. 3 may specifically include the following steps.

Step 301: The user equipment provides, to the first network device, reference paging information generated according to a moving speed of the user equipment, where the reference paging information is used by the network device to determine the paging area for sending a paging message. The first network device is generally the base station in the cell in which the user equipment is currently located. All specific operations in step 301 are similar to those in step 201, and a difference is that the user equipment reports the reference paging information to the first network device to which the user equipment belongs.

Step 302: The first network device transmits the received reference paging information to the second network device that can perform a paging area determining operation. If the first network device is the base station that can perform a paging area determining operation, this step is not required. In this case, a paging flowchart is the same as that in FIG. 2.

Step 303: The second network device determines the paging area according to the reference paging information transmitted by the user equipment. All specific operations in step 303 are the same as those in step 202, and a difference is that an execution body is the second network device that can perform a paging area determining operation.

Step 304: The second network device pages the user equipment in the paging area determined in step 303. The second network device may page the user equipment by using a base station corresponding to the paging area.

Certainly, in some cases, two special base stations may cooperate for processing. A person of ordinary skill in the art may understand that, in this manner, processing may be completed by means of interaction between the two special base stations.

By means of setting in the foregoing manner, a network device such as a core network device or the special base station may learn a relatively accurate location area of the user equipment in advance according to the information reported by the user equipment. This is different from the prior art in which all network devices initiate, in an entire tracking area, that is, in a relatively large range, paging on the user equipment. Therefore, in this embodiment of the present disclosure, utilization efficiency of wireless communications system paging resources (inter-network interface resources and air interface resources) can be greatly improved, thereby avoiding a paging resource waste in the prior art.

Embodiment 2

Embodiment 2 provides improvement on the basis of Embodiment 1. User equipment does not actively report reference paging information, but reports the reference paging information according to indication information delivered by a network device or a second network device that can perform a paging area determining operation. After learning related information of the user equipment, the network device or the second network device that can perform a paging area determining operation determines a paging area according to a status of the user equipment.

Figure 4:
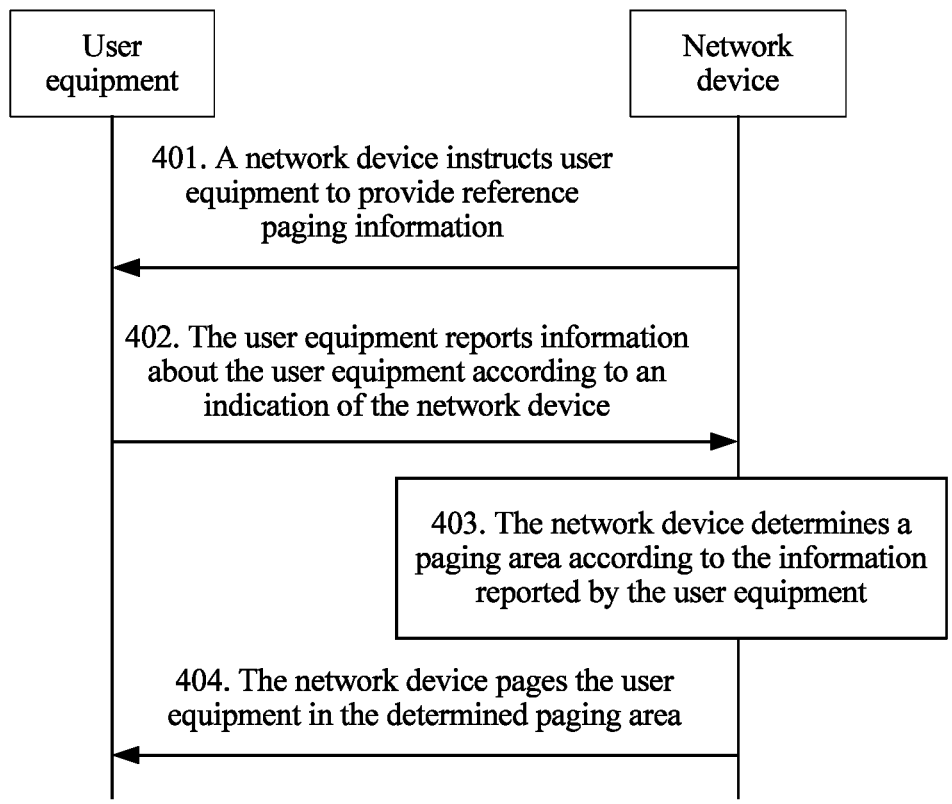
FIG. 4 is a schematic flowchart of a first paging method according to Embodiment 2 of the present disclosure.

The following describes the technical solution in Embodiment 2 of the present disclosure with reference to FIG. 4.

In this solution, the solution in FIG. 2 in Embodiment 1 is improved.

Specifically, in Embodiment 2, a condition that needs to be met for the user equipment to report the reference paging information is: receiving an indication delivered by the network device. Correspondingly, step 402 in Embodiment 2 is also changed. The user equipment reports the reference paging information according to the indication of the network device.

Step 401: The network device instructs the user equipment to provide reference paging information.

Specific content of the reference paging information is described in Embodiment 1, and details are not described herein again.

Step 402: The user equipment provides corresponding reference paging information to the network device according to the indication of the network device.

A transmission path for the user equipment to notify the network device of the reference paging information, content of the reference paging information, a network device type, a method for the user equipment to assess a level of a speed of the user equipment, a method for assessing a speed value of the user equipment, and a method for the user equipment to recommend a cell list to the network device for paging are the same as those in step 201 in Embodiment 1. Details are not described herein again.

Step 403 is the same as step 202 in Embodiment 1.
Step 404 is the same as step 203 in Embodiment 1.

Figure 5:
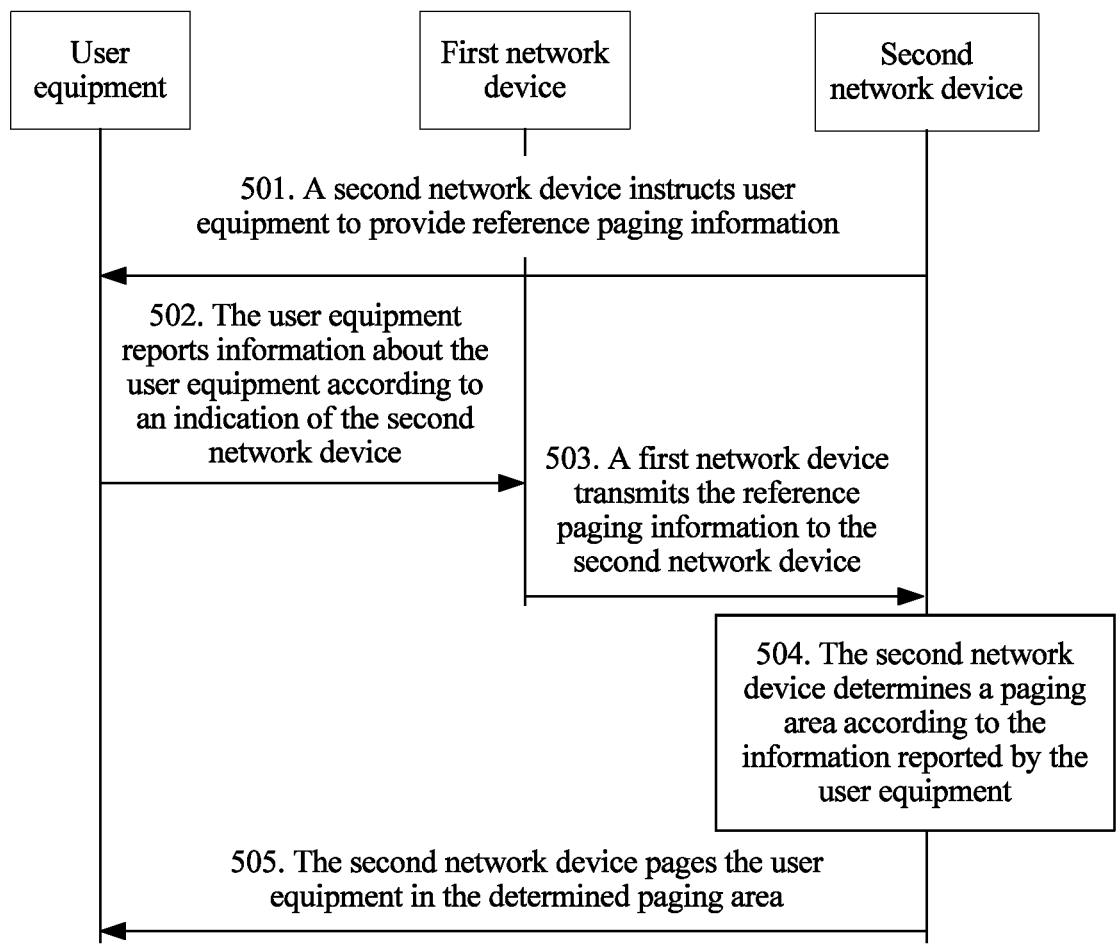
FIG. 5 is a schematic flowchart of a second paging method according to Embodiment 2 of the present disclosure.

The following describes the technical solution in Embodiment 2 of the present disclosure with reference to FIG. 5.

In this solution, the solution in FIG. 3 in Embodiment 1 is improved.

Step 501: A second network device that can perform a paging area determining operation instructs user equipment to provide reference paging information.

The second network device that can perform a paging area determining operation transmits the indication information to a first network device to which the user equipment belongs. If the user equipment belongs to the second network device, the second network device does not need to transmit the indication information to another network device, and the second network device and the first network device are a same network device.

The first network device to which the user equipment belongs sends the indication information of the second network device to the user equipment.

Step 502: The user equipment provides corresponding reference paging information to the first network device according to the indication of the second network device. All specific operations in step 502 are the same as those in step 402.

Step 503 is the same as step 302 in Embodiment 1.
Step 504 is the same as step 303 in Embodiment 1.
Step 505 is the same as step 304 in Embodiment 1.

By means of setting in the foregoing manner in Embodiment 2, the user equipment reports the information on a relatively flexible occasion, and may notify a network device of the information about the user equipment in a timely manner according to a paging requirement of a network device such as a core network device or a special base station, and the network device may adjust a paging area in a timely manner according to a status of the user equipment, so as to achieve accurate paging, and further improve utilization efficiency of wireless communications system paging resources.

Embodiment 3

Embodiment 3 provides improvement on the basis of Embodiment 1. User equipment does not actively report reference paging information, but assesses a moving speed of the user equipment, and determines, according to the moving speed, an occasion of reporting the reference paging information. When the moving speed meets a reporting trigger condition, the user equipment reports the reference paging information. After learning related information of the user equipment, a network device or a second network device that can perform a paging area determining operation determines a paging area according to a status of the user equipment.

Figure 6:
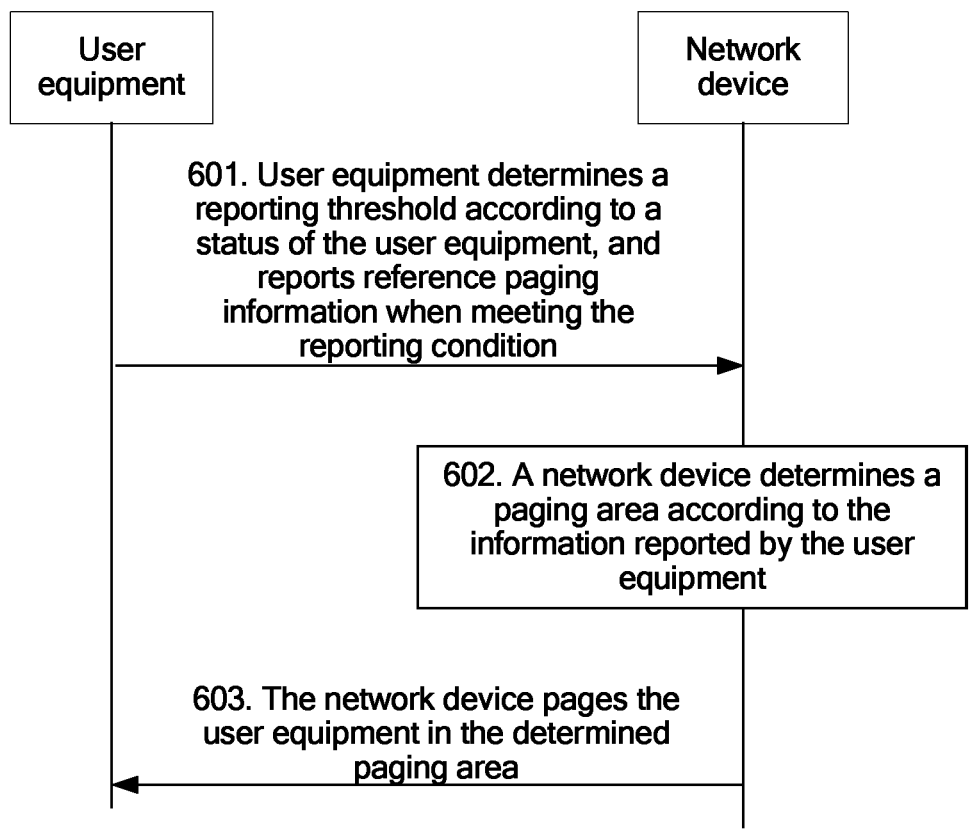
FIG. 6 is a schematic flowchart of a first paging method according to Embodiment 3 of the present disclosure.

The following describes the technical solution in Embodiment 3 of the present disclosure with reference to FIG. 6.

Specifically, in this solution, step 201 in the solution in FIG. 2 in Embodiment 1 is improved.

Step 601: User equipment determines, according to a status of the user equipment, a reporting trigger condition, and reports reference paging information when a moving speed of the user equipment meets the reporting trigger condition.

In step 601 in this embodiment, a transmission path for the user equipment to notify the network device of the reference paging information, content of the reference paging information, a network device type, a method for the user equipment to assess a level of the speed of the user equipment, a method for assessing a speed value of the user equipment, and a method for the user equipment to recommend a cell list to the network device for paging are the same as those in step 201 in Embodiment 1. Details are not described herein again.

Different from Embodiment 1, the user equipment in Embodiment 3 reports the reference paging information when meeting the reporting trigger condition. For the reporting trigger condition for the user equipment, when the moving speed of the user equipment is greater than a specified speed threshold P, or a speed level is a high speed, the user equipment reports the reference paging information once when passing through D cells or one tracking area; when the moving speed of the user equipment is less than or equal to a specified speed threshold P, and is greater than a specified speed threshold Q, or the speed level is a medium speed, the user equipment reports the reference paging information once when passing through E cells; or when the moving speed of the user equipment is less than or equal to a specified speed threshold Q, or the speed level is a low speed, the user equipment reports the reference paging information once when passing through F cells, where D, E, and F are positive integers, D is greater than E, E is greater than F, and P is greater than Q. A specific reporting trigger condition for the user equipment is set as follows: D=20, E=10, F=1, P=60 km/h, and Q=3 km/h.

Optionally, the user equipment in Embodiment 3 may change reporting frequency when the speed changes to a specific threshold value. When the speed of the user equipment increases, the reporting frequency of the user equipment is reduced, or when the speed of the user equipment decreases, the reporting frequency of the user equipment is increased. For example, when the speed of the user equipment is increased from a low speed to a speed greater than H, the user equipment reports the reference paging information once when passing through E' cells, and when the speed of the user equipment continues to be increased to a speed greater than or equal to J, the user equipment reports the reference paging information once when passing through D' cells or one tracking area; or when the speed of the user equipment is reduced from a high speed to a speed less than J, the user equipment reports the reference paging information once when passing through E' cells, and when the speed of the user equipment continues to be reduced to a speed less than or equal to H, the user equipment reports the reference paging information once when passing through F' cells. H, J, D', E', and F' are positive integers, D' is greater than E', E' is greater than F', and J is greater than H. Specific values are set as follows: D'=20, E'=10, F'=1, H=3 km/h, J=60 km/h.

The user equipment may further determine, according to the moving speed of the user equipment, frequency for reporting the reference paging information. When the moving speed is greater than a specified threshold, the frequency for reporting the reference paging information is increased; or when the moving speed is less than a specified threshold, the frequency for reporting the reference paging information is reduced. For example, when the speed of the user equipment is increased, the reporting frequency is increased but not reduced, and if the user equipment reports the recommended paging area, a quantity of cells in the recommended paging area reported by the user equipment remains unchanged, that is, not increased. When the speed of the user equipment is reduced, the reporting frequency is reduced but not increased, and if the user equipment reports the recommended paging area, a quantity of cells in the recommended paging area reported by the user equipment may remain unchanged, that is, not reduced. A technical effect of accurate paging may also be achieved by means of such a variation.

Step 602 is the same as step 202 in Embodiment 1.
Step 603 is the same as step 203 in Embodiment 1.
The following describes the technical solution in Embodiment 3 of the present disclosure with reference to FIG. 7.

Specifically, in this solution, step 301 in the solution in FIG. 3 in Embodiment 1 is improved.

Step 701: User equipment determines, according to a status of the user equipment, a reporting trigger condition, and reports reference paging information to a first network device to which the user equipment belongs when a moving speed of the user equipment meets the reporting trigger condition. All other operations in step 701 are similar to those in step 301.

Step 702 is the same as step 302 in Embodiment 1.
Step 703 is the same as step 303 in Embodiment 1.
Step 704 is the same as step 304 in Embodiment 1.

By means of setting in the foregoing manner in Embodiment 3, speed information of the user equipment and/or information about the recommended paging area reported by the user equipment are/is related to the speed of the user equipment, and a range for a network device such as a core network device or a special base station to page the user equipment is also related to the speed of the user equipment. In an actual application scenario, most user equipments are in a moving status of a medium speed or a low speed. For example, a user equipment user is driving or riding a car, or is walking or in a sit-in state. For user equipment moving at the medium speed or the low speed, the network device may learn a relatively accurate location area of the user equipment in advance. This is different from the prior art in which the network device initiates, in an entire tracking area, that is, in a relatively large range, paging on the user equipment. Therefore, utilization efficiency of wireless communications system paging resources can be greatly improved, for example, utilization efficiency of inter-network interface resources and air interface resources is improved, thereby avoiding a paging resource waste in the prior art.

Embodiment 4

Embodiment 4 provides improvement on the basis of Embodiment 3. User equipment does not assess a reporting condition voluntarily, but a network device or a second network device that can perform a paging area determining operation configures a reporting trigger condition for the user equipment. When meeting the reporting condition configured by the network device or the second network device that can perform a paging area determining operation, the user equipment reports reference paging information. After learning the reference paging information from the user equipment, the network device or the second network device that can perform a paging area determining operation determines a paging area according to a status of the user equipment.

Figure 8:
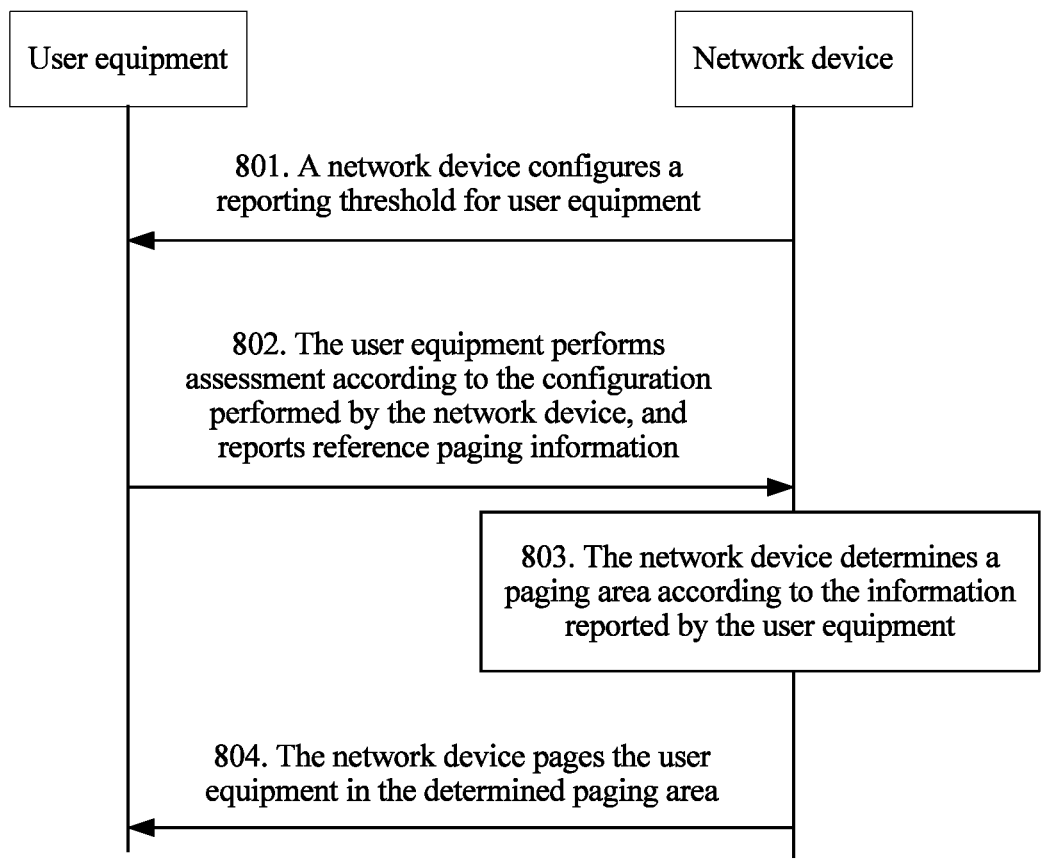
FIG. 8 is a schematic flowchart of a first paging method according to Embodiment 4 of the present disclosure.

The following describes the technical solution in Embodiment 4 of the present disclosure with reference to FIG. 8.

Specifically, a step in which a network device configures a reporting condition for user equipment (that is, step 801 in FIG. 8) is added in the solution in FIG. 8 on the basis of the solution in FIG. 6 in Embodiment 3. Correspondingly, step 802 in Embodiment 4 is also changed, in which the user equipment performs assessment according to the configuration performed by the network device, and reports reference paging information.

Step 801: The network device configures the reporting trigger condition for the user equipment, and sends the reporting trigger condition to the user equipment.

The reporting trigger condition for the user equipment is similar to the condition in Embodiment 3. A difference is that the network device sets the following: high-speed user equipment reports information once when passing through a relatively large area range, medium-speed user equipment reports information once when passing through a medium area range, and low-speed user equipment reports information once when passing through a small area range. A specific reporting trigger condition is similar to that in Embodiment 3, and details are not described herein again.

Optionally, a threshold for assessing a speed level of the user equipment and the reporting trigger condition are sent jointly by the network device to the user equipment.

Step 802: The user equipment performs assessment according to the condition configured by the network device, and notifies the network device of the reference paging information when the condition is met.

A transmission path for the user equipment to transmit the reference paging information, a type of information about the user equipment reported by the user equipment to the network device, a network device type, a method for the user equipment to assess the level of the speed of the user equipment, and a method for assessing a speed value of the user equipment are the same as those in step 601 in Embodiment 3.

Step 803 is the same as step 602 in Embodiment 3.
Step 804 is the same as step 603 in Embodiment 3.
The following describes the technical solution in Embodiment 4 of the present disclosure with reference to FIG. 9.

Figure 7:
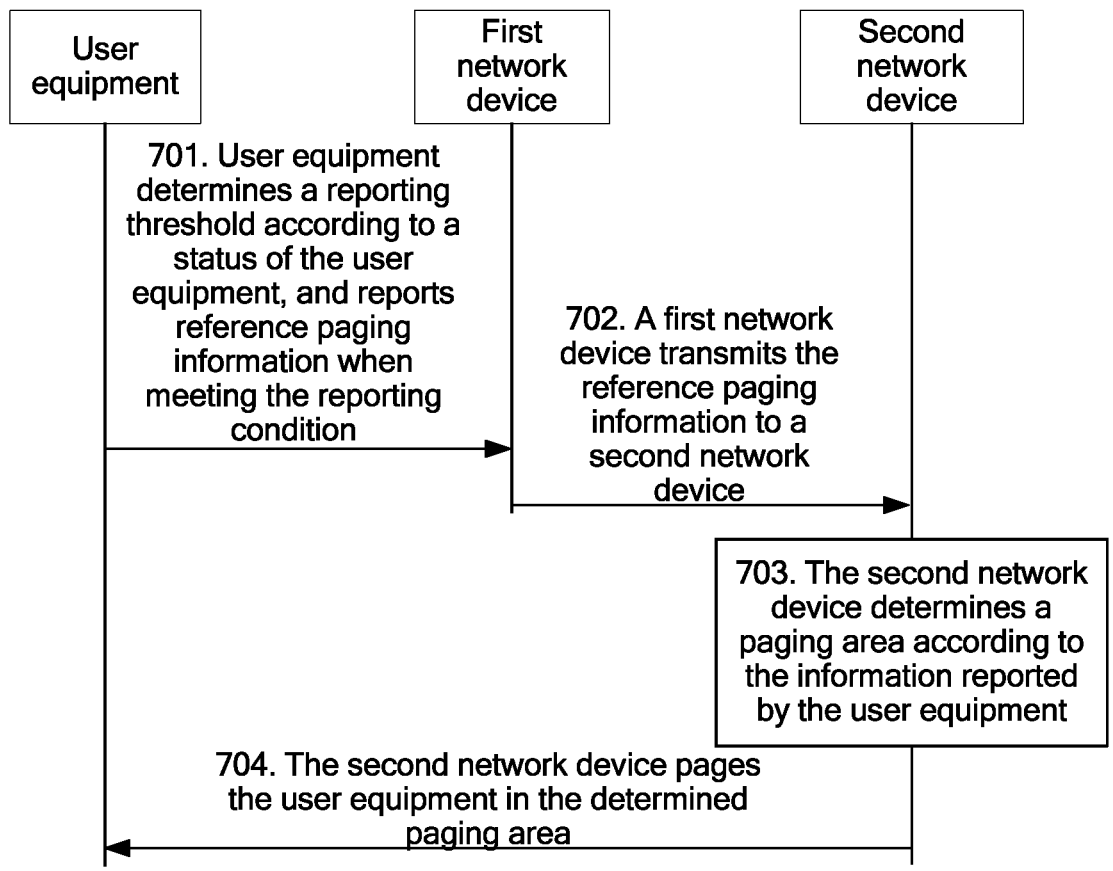
FIG. 7 is a schematic flowchart of a second paging method according to Embodiment 3 of the present disclosure.
Figure 9:
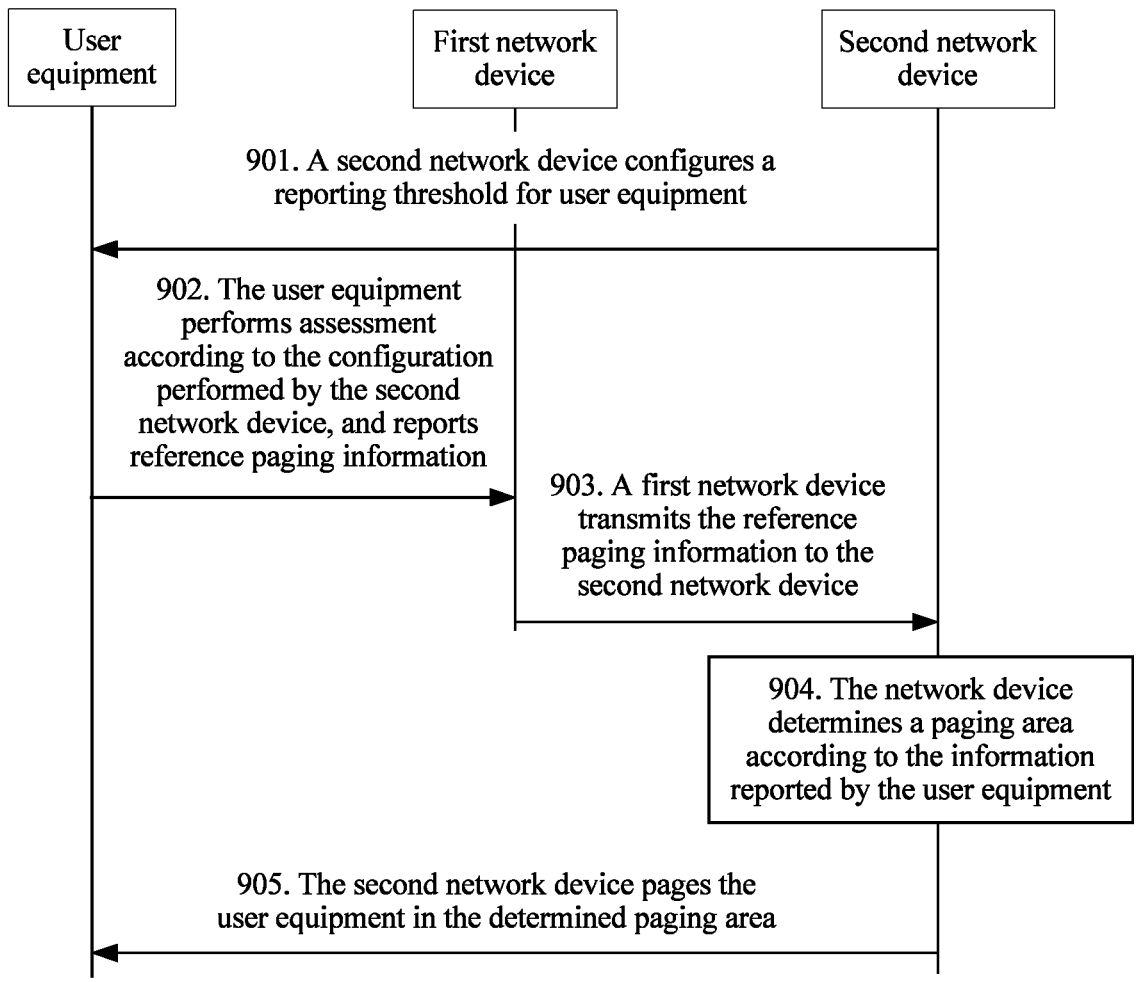
FIG. 9 is a schematic flowchart of a second paging method according to Embodiment 4 of the present disclosure.

Specifically, a step in which a second network device configures a reporting condition for user equipment (that is, step 901 in FIG. 9) is added in the solution in FIG. 9 on the basis of the solution in FIG. 7 in Embodiment 3. Correspondingly, step 902 in the solution in FIG. 9 is also changed, in which the user equipment performs assessment according to the configuration performed by the second network device, and reports reference paging information.

Step 901: The second network device that can perform a paging area determining operation configures the reporting trigger condition for the user equipment, and sends the reporting trigger condition to the user equipment.

The second network device that can perform a paging area determining operation transmits the reporting trigger condition to a first network device to which the user equipment belongs. If the user equipment belongs to the second network device, the second network device does not need to transmit the reporting trigger condition to another network device, and the second network device and the first network device are a same network device.

The first network device to which the user equipment belongs sends the reporting trigger condition of the second network device to the user equipment.

The reporting trigger condition for the user equipment is similar to the condition in Embodiment 3.

Step 902: The user equipment performs assessment according to the condition configured by the second network device, and notifies the first network device to which the user equipment belongs of the reference paging information when the condition is met.

A transmission path for the user equipment to transmit the reference paging information, a type of information about the user equipment reported by the user equipment to the network device, a network device type, a method for the user equipment to assess a level of the speed of the user equipment, and a method for assessing a speed value of the user equipment are the same as those in step 701 in Embodiment 3.

Step 903 is the same as step 702 in Embodiment 3.
Step 904 is the same as step 703 in Embodiment 3.
Step 905 is the same as step 704 in Embodiment 3.

By means of setting in the foregoing manner in Embodiment 4, a network device such as a core network device or a special base station sets the reporting trigger condition for the user equipment, and the network device may set frequency for reporting the reference paging information for the user equipment according to a paging requirement. This strengthens control on the user equipment, thereby achieving more accurate paging and fewer paging resource wastes.

Embodiment 5

Embodiment 5 is corresponding to Embodiment 1. Embodiment 5 describes user equipment and a network device that perform the paging method in Embodiment 1.

Figure 10:
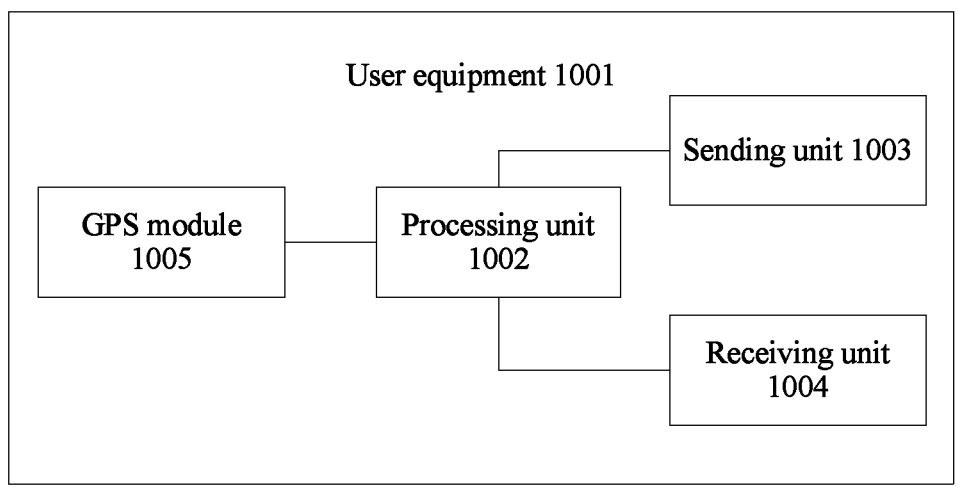
FIG. 10 is a schematic structural diagram of user equipment according to an embodiment of the present disclosure.
Figure 11:
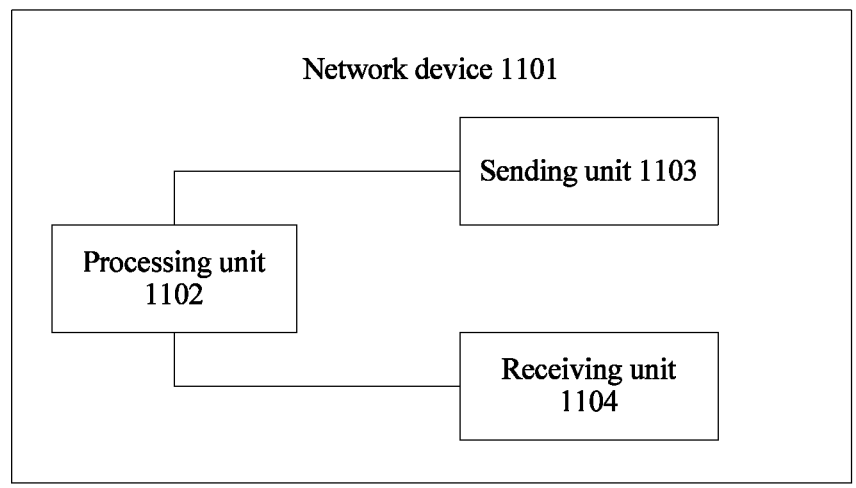
FIG. 11 is a schematic structural diagram of a network device according to an embodiment of the present disclosure.

The following describes the device in Embodiment 5 of the present disclosure with reference to FIG. 10 and FIG. 11.

As shown in FIG. 10, user equipment 1001 includes: a processing unit 1002, a sending unit 1003, and a receiving unit 1004. If necessary, the user equipment 1001 may further include a GPS module 1005.

As shown in FIG. 11, a network device 1101 includes: a processing unit 1102, a sending unit 1103, and a receiving unit 1104.

A person skilled in the art should understand that the user equipment 1001 and the network device 1101 should further include another necessary component that completes communication functions of the user equipment 1001 and the network device 1101, such as a power supply unit. However, because the component is unrelated to the present disclosure, details are not described herein.

Specifically, the network device 1101 in FIG. 11 may be a core network device, and the core network device completes a paging operation. In this implementation, the two network devices are usually a same core network device. The following mainly uses one core network device as an example for description. The network device is a core network device to which a base station in a cell in which user equipment is currently located is connected.

The user equipment 1001 provides, to the network device 1101 by using the sending unit 1003, reference paging information generated according to a moving speed of the user equipment 1001, where the reference paging information is used by the network device 1101 to determine a paging area for sending a paging message.

The reference paging information is generated by the processing unit 1002. To generate the reference paging information, the processing unit 1002 usually needs to perform at least one of the following processing: (1) assessing a speed level and/or a moving direction of the user equipment 1001; (2) if the user equipment 1001 includes the GPS module, obtaining a moving speed and/or a moving direction of the user equipment 1001 from the GPS module 1005; or (3) recommending, according to a speed of the user equipment 1001 and a location of a cell in which the user equipment 1001 is located, a recommended paging area to the network device for paging. Content of the reference paging information generated by the processing unit 1002, a method for the processing unit 1002 to assess a level of the speed of the user equipment 1001, a method for the processing unit 1002 to assess a speed value of the user equipment 1001, and a method for the processing unit 1002 to generate a cell list to be recommended to the network device 1101 for paging are the same as those in step 201 in Embodiment 1.

Specifically, the reference paging information may include moving speed information of the user equipment 1001, where the moving speed information of the user equipment 1001 may include a moving speed level of the user equipment 1001, for example, a high speed, a medium speed, or a low speed; and/or the speed value of the user equipment 1001; and/or the reference paging information may include a recommended paging area determined by the processing unit 1002 according to the moving speed of the user equipment 1001 and the location of the cell in which the user equipment 1001 is currently located.

In addition, the reference paging information may further include the cell in which the user equipment 1001 is currently located, a neighboring cell list, and/or the like.

When assessing the level of the speed of the user equipment 1001, the processing unit 1002 may perform determining by using a quantity of cells that are passed through by the user equipment 1001 in a unit time. That is, a larger quantity of cells that are passed through by the user equipment 1001 in the unit time indicates a higher assessed speed of the user equipment 1001, and vice versa. For a specific assessment manner, refer to description in the foregoing method embodiments, and details are not described herein again.

Specifically, the processing unit 1002 may assess the speed value of the user equipment 1001 in a user equipment speed measurement manner in the prior art. For example, the GPS module 1005 of the user equipment 1001 is used to obtain a current speed of the user equipment.

The processing unit 1002 generates, according to the speed of the user equipment 1001 and the location of the cell in which the user equipment 1001 is located, the recommended paging area to be recommended to the network device for paging. A higher speed of the user equipment 1001 indicates a larger recommended paging area, and a lower speed of the user equipment 1001 indicates a smaller recommended paging area. For a specific implementation of determining the recommended paging area, refer to description in the foregoing method embodiments, and details are not described herein again.

Optionally, the reference paging information generated by the processing unit 1002 may further include a current moving direction of the user equipment 1001. The moving direction may be assessed while the user equipment 1001 assesses the level of the speed of the user equipment 1001. For example, the current moving direction of the user equipment 1001 is determined according to a path of cells that are passed through by the user equipment 1001, or the current moving direction of the user equipment 1001 may be obtained by using the GPS module 1005 of the user equipment 1001. Correspondingly, when generating a paging area to be recommended to the network device, in addition to considering the speed information of the user equipment 1001 and location information of the cell in which the user equipment 1001 is located, the processing unit 1002 further needs to consider the moving direction of the user equipment 1001. For example, a cell range in a possible future direction of the user equipment 1001 is preferably recommended as the recommended paging area according to the moving direction of the user equipment 1001, and a cell in a direction opposite to the moving direction of the user equipment 1001 is not selected. In a case of a higher speed of the user equipment 1001, a cell that is farther from the current cell and that is in the moving direction of the user equipment 1001 is selected as the recommended paging area. In a case of a lower speed of the user equipment 1001, a cell that is closer to the current cell and that is in the moving direction of the user equipment 1001 is selected as the recommended paging area.

The sending unit 1003 reports the reference paging information to the network device 1101 by using a message transmission path of a wireless communications network. If the user equipment 1001 attempts to transmit the information about the user equipment 1001 to an network access device such as a base station, the user equipment 1001 may perform transmission by using an access stratum message. If the user equipment 1001 attempts to transmit the information about the user equipment 1001 to a core network device, the user equipment 1001 may perform transmission by using a non-access stratum message. During transmission by using the non-access stratum message, for example, when changing a tracking area during a moving process, the user equipment 1001 performs TA update (tracking area update). In this case, the processing unit 1002 generates the reference paging information, and transmits the reference paging information to the sending unit 1003, so as to notify the network device 1101 of the reference paging information by using a tracking area update message. Alternatively, during power-on attachment of the user equipment 1001, the processing unit 1002 generates the reference paging information, and transmits the reference paging information to the sending unit 1003, so as to notify the network device of the reference paging information by using a power-on attachment message.

Correspondingly, for the network device 1101, after receiving the reference paging information reported by the user equipment 1001, the receiving unit 1104 of the network device 1101 transmits the reference paging information to the processing unit 1102. The processing unit 1102 determines the paging area according to the reference paging information. A specific determining manner is the same as that in step 202 in Embodiment 1.

Specifically, the core network device may learn information about the cell in which the user equipment 1001 is located or a neighboring cell from the network access device, or the reference paging information reported by the user equipment 1001 to the network device may include information such as information about the cell in which the user equipment 1001 is located and/or the neighboring cell. Regardless of which manner is used, the network device 1101 may obtain the information about the cell in which the user equipment 1001 is currently located and the information about the neighboring cell.

After the network device 1101 learns the reference paging information of the user equipment, the processing unit 1102 may determine the paging area according to the reference paging information. If the reference paging information reported by the user equipment 1001 to the network device 1101 includes the speed information of the user equipment 1001, the processing unit 1102 may determine the paging area according to the speed information of the user equipment 1001 and the location information of the cell in which the user equipment 1001 is located. If the reference paging information reported by the user equipment 1001 to the network device 1101 includes the recommended paging area recommended by the user equipment 1001 for paging, for example, a cell list or a TA list, the processing unit 1102 may set the recommended paging area reported by the user equipment 1001 as the paging area. If the reference paging information reported by the user equipment 1001 to the network device 1101 includes both the speed information of the user equipment and the recommended paging area, the processing unit 1102 may select one from or combine a paging area determined according to the speed information of the user equipment and the paging area recommended by the user equipment 1001, so as to determine a final paging area. Specifically, if two areas are different, the processing unit 1102 may select an area with more cells as the paging area, or select a total area obtained by combining the two areas as the paging area. A person skilled in the art may perform selection according to a specific application case, and details are not described herein.

A manner in which the processing unit 1102 determines the paging area according to the speed information of the user equipment 1001 and the location information of the cell in which the user equipment 1001 is located may be similar to a manner in which the processing unit 1002 recommends the paging area to the network device 1101 according to the speed of the user equipment 1001 and the location of the cell in which the user equipment 1001 is located. For specific processing, refer to description in the foregoing method embodiments, and an implementation in which the user equipment 1001 determines the recommended paging area, and details are not described herein again.

Optionally, if the reference paging information reported by the user equipment 1001 further includes the moving direction of the user equipment 1001, the processing unit 1102 further needs to consider the moving direction of the user equipment 1001 when determining the paging area. A specific determining manner is similar to the manner in which the user equipment 1001 reports the recommended paging area. For example, the processing unit 1102 preferably determines a cell range in a possible future direction of the user equipment 1001 as the paging area according to the moving direction of the user equipment 1001, and does not select a cell in a direction opposite to the moving direction of the user equipment 1001. In a case of a higher speed of the user equipment 1001, the processing unit 1102 determines, as the paging area, a cell that is farther from the current cell and that is in the moving direction of the user equipment 1001. In a case of a lower speed of the user equipment 1001, the processing unit 1102 determines, as the paging area, a cell that is closer to the current cell and that is in the moving direction of the user equipment 1001.

After determining the paging area, the processing unit 1102 sends information about the paging area to the sending unit 1103, and the sending unit 1103 sends, in the paging area, the paging message to the user equipment 1001. The receiving unit 1004 of the user equipment 1001 receives the paging message sent by the network device 1101, so that a paging process is completed.

For the user equipment 1001, the processing unit 1002 may be specifically a processor of the user equipment, the sending unit 1003 may be a transmitter, and the receiving unit 1004 may be a receiver. That is, the user equipment 1001 may include a processor, a transmitter, and a receiver.

The user equipment 1001 may further include a memory, a transceiver, and the like. The memory is configured to store instructions required for performing various operations in the foregoing embodiments, and the processor executes these instructions in the memory. The transceiver may perform receiving and sending processing in the foregoing embodiments.

Figure 12:
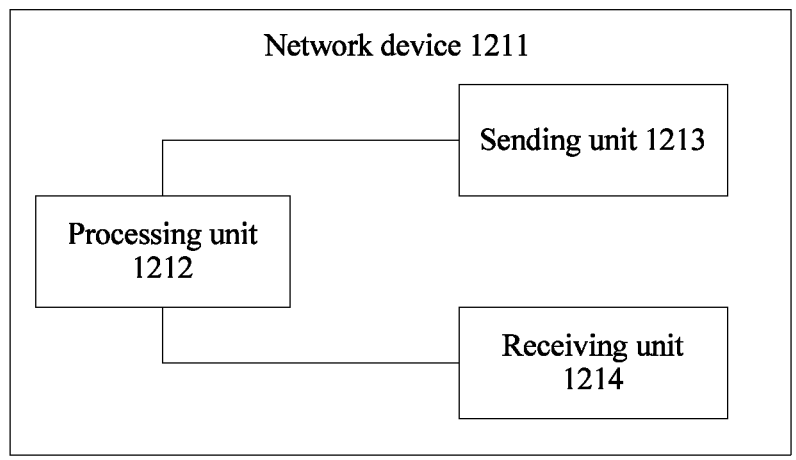
FIG. 12 is a schematic structural diagram of another network device according to an embodiment of the present disclosure.
Figure 12:
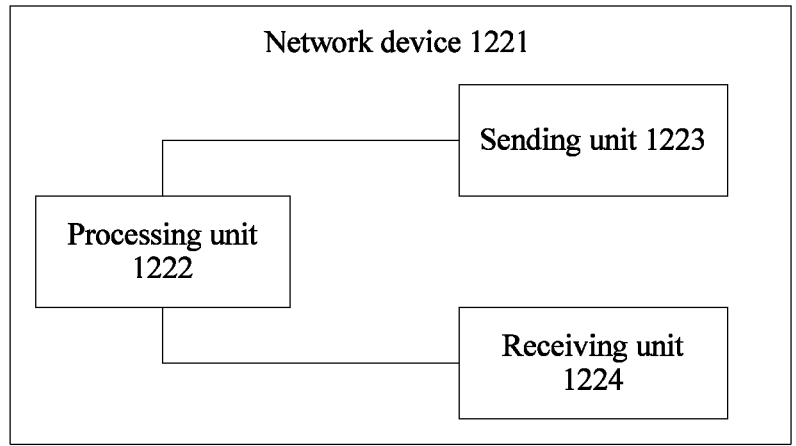

The following describes the device in Embodiment 5 of the present disclosure with reference to FIG. 10 and FIG. 12.

FIG. 10 shows user equipment, which is described above.

As shown in FIG. 12, a first network device 1211 includes: a processing unit 1212, a sending unit 1213, and a receiving unit 1214. A second network device 1221 includes: a processing unit 1222, a sending unit 1223, and a receiving unit 1224.

Specifically, the first network device 1211 and the second network device 1221 in FIG. 12 may be base stations, and the base stations complete a paging operation. In this implementation, the first network device 1211 is generally a base station in a cell in which the user equipment is currently located, but the base station in the cell in which user equipment 1001 is currently located, that is, the first network device 1211, may not be a special base station that can perform a paging area determining operation. In this case, the base station needs to send the reference paging information to a special base station that can perform a paging area determining operation, and the special base station determines a paging area. In this case, the second network device 1221 is the special base station.

The user equipment 1001 provides, to the first network device 1211 by using a sending unit 1003, the reference paging information generated according to a moving speed of the user equipment 1001, where the reference paging information is used by the network device 1101 to determine a paging area for sending a paging message.

All specific operations performed by the user equipment 1001 are similar to the operations performed by the user equipment 1001 to send the reference paging information to the network device 1101, including: generation of the reference paging information by a processing unit 1002, content included in the reference paging information, a manner in which the processing unit 1002 assesses a level of the speed of the user equipment 1001, assessment of a speed value of the user equipment 1001 by the processing unit 1002, a manner in which the processing unit 1002 generates a recommended paging area, and a manner in which the sending unit 1003 reports the reference paging information to the first network device 1211 by using a message transmission path of a wireless communications network. A difference is that the user equipment 1001 reports the reference paging information to the first network device 1211 to which the user equipment belongs.

Correspondingly, for the first network device 1211, after receiving the reference paging information reported by the user equipment 1001, the receiving unit 1214 of the first network device 1211 transmits the reference paging information to the processing unit 1212. The processing unit 1212 determines whether the first network device 1211 can perform a paging area determining operation. If the first network device 1211 is a special base station that can perform a paging area determining operation, the first network device initiates a paging area determining operation according to the reference paging information. If the first network device 1211 is not a special base station that can perform a paging area determining operation, the processing unit 1212 transmits the reference paging information to the sending unit 1213, and the sending unit 1213 of the first network device 1211 sends the reference paging information to the network device 1221 that can perform a paging area determining operation.

The receiving unit 1224 of the second network device 1221 receives the reference paging information sent by the first network device 1211, and then transmits the reference paging information to the processing unit 1222. The processing unit 1222 may determine the paging area according to the reference paging information. A specific determining manner is the same as the foregoing determining manner of the processing unit 1102, but the paging area is determined by the processing unit 1222 of the second network device. Details are not described herein again.

After determining the paging area, the processing unit 1222 sends information about the paging area to the sending unit 1223, and the sending unit 1223 sends, in the paging area, the paging message to the user equipment 1001. A receiving unit 1004 of the user equipment 1001 receives the paging message sent by the network device 1221, so that a paging process is completed.

Technical effects in this embodiment are the same as those in Embodiment 1. Utilization efficiency of wireless communications system paging resources (inter-network interface resources and air interface resources) can be greatly improved, and a paging resource waste in the prior art is avoided.

Embodiment 6

Embodiment 6 provides improvement on the basis of Embodiment 5, and is corresponding to Embodiment 2. Embodiment 6 describes user equipment and a network device that perform the paging method in Embodiment 2. User equipment 1001 does not actively report reference paging information, but reports the reference paging information according to indication information delivered by a network device 1101 or a second network device 1221. After learning related information of the user equipment, the network device 1101 or the second network device 1221 determines a paging area according to a status of the user equipment.

The following describes the device in Embodiment 6 of the present disclosure with reference to FIG. 10 and FIG. 11.

Specifically, improvement in this solution relative to Embodiment 5 is: a sending unit 1103 of the network device 1101 sends, to the user equipment 1001 under control of a processing unit 1102, an indication that instructs to provide reference paging information. After receiving the indication that instructs to provide the reference paging information and that is sent by the network device 1101, a receiving unit 1004 of the user equipment 1001 transmits the indication information to a processing unit 1002. The processing unit 1002 generates the reference paging information according to the indication information, and controls a sending unit 1003 to send the reference paging information to the network device 1101. In addition to this, all other operations in Embodiment 6 are the same as those in Embodiment 5, and details are not described herein again.

The following describes the device in Embodiment 6 of the present disclosure with reference to FIG. 10 and FIG. 12.

Specifically, improvement in this solution relative to Embodiment 5 is: a sending unit 1223 of the second network device 1221 that can perform a paging area determining operation sends, to the first network device 1211 to which the user equipment 1001 belongs under control of the processing unit 1222, the indication that instructs to provide reference paging information. If the user equipment 1001 belongs to the second network device 1221, the second network device 1221 does not need to transmit the indication to another network device, and the second network device 1221 and the first network device 1211 are a same network device.

A receiving unit 1214 of the first network device 1211 receives the indication information, and sends, under control of the processing unit 1212, the indication information of the second network device 1221 to the user equipment 1001 by using the sending unit 1213.

The receiving unit 1004 of the user equipment 1001 receives the indication of the second network device 1221, and transmits the indication to the processing unit 1002. The processing unit 1002 provides corresponding reference paging information to the first network device according to the indication, and then the first network device 1211 transmits the reference paging information to the second network device 1221.

In addition to this, all other operations in Embodiment 6 are the same as those in Embodiment 5, and details are not described herein again.

Technical effects in this embodiment are the same as those in Embodiment 2. The user equipment 1001 reports the information on a relatively flexible occasion, and may notify the network device of the information about the user equipment in a timely manner according to a paging requirement of the network device 1101 or the second network device 1221, and the network device 1101 or the second network device 1221 may adjust a paging area in a timely manner according to a status of the user equipment 1001, so as to achieve accurate paging, and further improve utilization efficiency of wireless communications system paging resources.

Embodiment 7

Embodiment 7 provides improvement on the basis of Embodiment 5, and is corresponding to Embodiment 3. Embodiment 7 describes user equipment and a network device that perform the paging method in Embodiment 3. User equipment 1001 does not actively report reference paging information, but assesses a moving speed of the user equipment 1001, and determines, according to the moving speed, an occasion of reporting the reference paging information. When the moving speed meets a reporting trigger condition, the user equipment 1001 reports the reference paging information. After learning related information of the user equipment 1001, a network device 1101 or a second network device 1221 determines a paging area according to a status of the user equipment 1001.

The following describes the device in Embodiment 7 of the present disclosure with reference to FIG. 10 and FIG. 11.

Specifically, improvement in this solution relative to Embodiment 5 is: a control unit 1002 of the user equipment 1001 determines a status of the user equipment 1001, and determines a reporting trigger condition. When the moving speed of the user equipment 1001 meets the reporting trigger condition, the control unit 1002 generates the reference paging information, and controls a sending unit 1003 to send the reference paging information to the network device 1101. A manner in which the control unit 1002 determines the reporting trigger condition is the same as that in step 401 in Embodiment 3. In addition to this, all other operations in Embodiment 7 are the same as those in Embodiment 5, and details are not described herein again.

The following describes the device in Embodiment 7 of the present disclosure with reference to FIG. 10 and FIG. 12.

Specifically, improvement in this solution relative to Embodiment 5 is: the control unit 1002 of the user equipment 1001 determines the status of the user equipment 1001, and determines the reporting trigger condition. When the moving speed of the user equipment 1001 meets the reporting trigger condition, the control unit 1002 generates the reference paging information, and controls the sending unit 1003 to send the reference paging information to a first network device 1211. The manner in which the control unit 1002 determines the reporting trigger condition is the same as that in step 401 in Embodiment 3. In addition to this, all other operations in Embodiment 7 are the same as those in Embodiment 5, and details are not described herein again.

Technical effects in this embodiment are the same as those in Embodiment 3. Utilization efficiency of wireless communications system paging resources can be greatly improved, and a paging resource waste in the prior art is avoided.

Embodiment 8

Embodiment 8 provides improvement on the basis of Embodiment 7, and is corresponding to Embodiment 4. Embodiment 8 describes user equipment and a network device that perform the paging method in Embodiment 4. User equipment 1001 does not assess a reporting condition voluntarily, but a network device 1101 or a second network device 1221 configures a reporting trigger condition for the user equipment 1001. When meeting the reporting condition configured by the network device 1101 or the second network device 1221, the user equipment 1001 reports reference paging information. After learning the reference paging information from the user equipment 1001, the network device 1101 or the second network device 1221 determines a paging area according to a status of the user equipment 1001.

The following describes the device in Embodiment 8 of the present disclosure with reference to FIG. 10 and FIG. 11.

Specifically, improvement in this solution relative to Embodiment 7 is: a processing unit 1102 of the network device 1101 configures the reporting trigger condition for the user equipment 1001, and transmits the reporting trigger condition to a sending unit 1103, and the sending unit 1103 sends the reporting trigger condition to the user equipment 1001. A receiving unit 1004 of the user equipment 1001 receives the reporting trigger condition, and transmits the reporting trigger condition to the processing unit 1002, and the processing unit 1002 performs assessment according to the condition configured by the network device 1101. The processing unit 1002 generates the reference paging information when the condition is met, and controls a sending unit 1003 to send the reference paging information to the network device 1101. In addition to this, all other operations in Embodiment 8 are the same as those in Embodiment 7, and details are not described herein again.

The following describes the device in Embodiment 8 of the present disclosure with reference to FIG. 10 and FIG. 12.

Specifically, improvement in this solution relative to Embodiment 7 is: a processing unit 1222 of the second network device 1221 configures the reporting trigger condition for the user equipment 1001, and transmits the reporting trigger condition to a sending unit 1223, and the sending unit 1223 sends the reporting trigger condition to the first network device 1211. A receiving unit 1214 of the first network device 1211 receives the reporting trigger condition, and sends the reporting trigger condition to the user equipment 1001 by using the sending unit 1213 under control of a processing unit 1212. A receiving unit 1004 of the user equipment 1001 receives the reporting trigger condition, and transmits the reporting trigger condition to the processing unit 1002, and the processing unit 1002 performs assessment according to the condition configured by the second network device 1221. The processing unit 1002 generates the reference paging information when the condition is met, and controls the sending unit 1003 to send the reference paging information to the first network device 1211. In addition to this, all other operations in Embodiment 8 are the same as those in Embodiment 7, and details are not described herein again.

Technical effects in this embodiment are the same as those in Embodiment 4. The network device 1101 or the second network device 1221 may set frequency for reporting the reference paging information for the user equipment 1001 according to a paging requirement. This strengthens control on the user equipment, thereby achieving more accurate paging and fewer paging resource wastes.

The present disclosure may be applied to a wireless communications system. The wireless communications system includes the user equipment and the network device.

Functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present disclosure essentially, or the part contributing to the prior art, or all or some of the technical solutions may be implemented in the form of a software product. The software product is stored in a storage medium and includes several instructions for instructing a computer device (which may be a personal computer, a server, or a network device) to perform all or some of the steps of the methods described in the embodiments of the present disclosure. The foregoing storage medium includes: any medium that can store program code, such as a USB flash drive, a removable hard disk, a read-only memory (ROM), a random access memory (RAM), a magnetic disk, or an optical disc.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, it should be understood that the embodiments may be combined with each other provided that no contradiction occurs between the embodiments.

The invention claimed is:

1. A paging method, comprising:
    determining, by user equipment in response to a reporting trigger condition, reference paging information based at least in part on a moving speed of the user equipment and a moving direction of the user equipment, comprising:
        determining a first trigger condition when the moving speed of the user equipment is greater than a specified speed threshold P, and the user equipment passes through D cells,
        determining a second trigger condition when the moving speed of the user equipment is less than or equal to the specified speed threshold P and is greater than a specified speed threshold Q, and the user equipment passes through E cells,
        determining a third trigger condition when the moving speed of the user equipment is less than or equal to the specified speed threshold Q, and the user equipment passes through F cells,
        determining the moving direction while assessing the moving speed of the user equipment,
        determining a recommended paging area based on a moving speed associated with a determined trigger condition and the moving direction, and
        wherein D, E, and F are positive integers, D is greater than E, E is greater than F, and P is greater than Q;
    sending, by the user equipment, the recommended paging area with the reference paging information to a network device for determining a paging area of the user equipment; and
    receiving, by the user equipment, a paging message sent in the paging area by the network device.

2. The method according to claim 1, wherein the reference paging information comprises:
    moving speed information of the user equipment, comprising:
        a moving speed level of the user equipment, comprising a one of a high speed, a medium speed, and a low speed, or
        a speed value of the user equipment; or
    a recommended paging area determined by the user equipment according to the moving speed and a location of a cell in which the user equipment is currently located.

3. The method according to claim 2, further comprising:
    determining, by the user equipment, the moving speed level according to a quantity of cells passed through by the user equipment in a specified time period.

4. The method according to claim 3, further comprising:
    determining the moving speed level is high when the user equipment passes through more than X cells in a first time period; or
    determining the moving speed level is medium when the user equipment passes through X cells or cells less than X but more than Y in the first time period; or
    determining the moving speed level is low when the user equipment passes through Y cells or less in the first time period; and
    wherein X and Y are positive integers, and X is greater than Y.

5. The method according to claim 2, further comprising:
    when the moving speed of the user equipment is greater than the specified speed threshold P, or the speed level is the high speed, the recommended paging area is a TA area in which the user equipment is currently located or A cells near the cell in which the user equipment is currently located;

when the moving speed of the user equipment is less than or equal to the specified speed threshold P, and is greater than the specified speed threshold Q, or the speed level is the medium speed, the recommended paging area is B cells near the cell in which the user equipment is currently located; or when the moving speed of the user equipment is less than or equal to the specified speed threshold Q, or the speed level is the low speed, the recommended paging area is C cells near the cell in which the user equipment is currently located; and wherein A, B, and C are positive integers, A is greater than B, and B is greater than C.

6. The method according to claim 1, wherein the network device is a core network device.

7. The method according to claim 1, wherein the reference paging information further comprises any one or any combination of the following: the cell in which the user equipment is currently located or a neighboring cell list.

8. User equipment, comprising:
a storage medium including executable instructions; and
a processor;
wherein the executable instructions, when executed by the processor, cause the processor to:
determine, in response to a reporting trigger condition, reference paging information based at least in part on a moving speed of the user equipment and a moving direction of the user equipment, comprising:
determining a first trigger condition when the moving speed of the user equipment is greater than a specified speed threshold P, and the user equipment passes through D cells,
determining a second trigger condition when the moving speed of the user equipment is less than or equal to the specified speed threshold P and is greater than a specified speed threshold Q, and the user equipment passes through E cells, or
determining a third trigger condition when the moving speed of the user equipment is less than or equal to the specified speed threshold Q, and the user equipment passes through F cells,
determining the moving direction while assessing the moving speed of the user equipment,
determining a recommended paging area based on a moving speed associated with a determined trigger condition and the moving direction, and
wherein D, E, and F are positive integers, D is greater than E, E is greater than F, and P is greater than Q;
send the recommended paging area with the reference paging information to a network device for determining a paging area of the user equipment; and
receive a paging message sent in the paging area by the network device.

9. The user equipment according to claim 8, wherein the reference paging information comprises:
moving speed information of the user equipment, comprising:
a moving speed level of the user equipment, comprising a one of a high speed, a medium speed, and a low speed, or
a speed value of the user equipment; or
a recommended paging area determined by the user equipment according to the moving speed and a location of a cell in which the user equipment is currently located.

10. The user equipment according to claim 9, wherein the executable instructions, when executed by the processor, further cause the apparatus to:
determine the moving speed level according to a quantity of cells passed through by the user equipment in a specified time period.

11. The user equipment according to claim 10, wherein the executable instructions, when executed by the processor, further cause the apparatus to:
determine the moving speed level is high when the user equipment passes through more than X cells in a first time period; or
determine the moving speed level is medium when the user equipment passes through X cells or cells less than X but more than Y in the first time period; or
determine the moving speed level is low when the user equipment passes through Y cells or less in the first time period; and
wherein X and Y are positive integers, and X is greater than Y.

12. The user equipment according to claim 9, wherein:
when the moving speed of the user equipment is greater than the specified speed threshold P, or the speed level is the high speed, the recommended paging area is a TA area in which the user equipment is currently located or A cells near the cell in which the user equipment is currently located;
when the moving speed of the user equipment is less than or equal to the specified speed threshold P, and is greater than the specified speed threshold Q, or the speed level is the medium speed, the recommended paging area is B cells near the cell in which the user equipment is currently located; or
when the moving speed of the user equipment is less than or equal to the specified speed threshold Q, or the speed level is the low speed, the recommended paging area is C cells near the cell in which the user equipment is currently located; and
wherein A, B, and C are positive integers, A is greater than B, and B is greater than C.

13. The user equipment according to claim 8, wherein the network device is a core network device.

14. The user equipment according to claim 8, wherein the reference paging information further comprises any one or any combination of the following: the cell in which the user equipment is currently located or a neighboring cell list.

15. A network device, comprising:
a storage medium including executable instructions; and
a processor;
wherein the executable instructions, when executed by the processor, cause the processor to:
send a reporting trigger condition to user equipment, comprising:
determining a first trigger condition when the moving speed of the user equipment is greater than a specified speed threshold P, and the user equipment passes through D cells,
determining a second trigger condition when the moving speed of the user equipment is less than or equal to the specified speed threshold P and is greater than a specified speed threshold Q, and the user equipment passes through E cells, or determining a third trigger condition when the moving speed of the user equipment is less than or equal to the specified speed threshold Q, and the user equipment passes through F cells, determining the moving direction while assessing the moving speed of the user equipment, and wherein D, E, and F are positive integers, D is greater than E, E is greater than F, and P is greater than Q;

receive reference paging information including a recommended paging area sent by user equipment, the recommended paging area generated by the user equipment based on a moving speed associated with a determined trigger condition and the moving direction;

determine, according to the reference paging information based at least in part on the recommended paging area, a paging area of the user equipment; and send, in the paging area, a paging message to the user equipment.

16. The network device according to claim 15, wherein the reference paging information comprises:

moving speed information of the user equipment, comprising:

a moving speed level of the user equipment, comprising a one of a high speed, a medium speed, and a low speed, or a speed value of the user equipment; or a recommended paging area determined by the user equipment according to the moving speed and a location of a cell in which the user equipment is currently located; and wherein the executable instructions, when executed by the processor, further cause the apparatus to:

use the recommended paging area as the paging area, or determine the paging area according to the moving speed information and a location of a cell in which the user equipment is currently located.

17. The network device according to claim 16, wherein the processor is configured to:

when the moving speed reported by the user equipment is greater than the specified speed threshold P, or the reported speed level is the high speed, determine, as the paging area, a TA area in which the user equipment is currently located or A cells near the cell in which the user equipment is currently located;

when the moving speed reported by the user equipment is less than or equal to the specified speed threshold P, and is greater than the specified speed threshold Q, or the reported speed level is the medium speed, determine, as the paging area, B' cells near the cell in which the user equipment is currently located; or when the moving speed reported by the user equipment is less than or equal to the specified speed threshold Q, or the reported speed level is the low speed, determine, as the paging area, C cells near the cell in which the user equipment is currently located, wherein A, B, and C are positive integers, A is greater than B, and B is greater than C.

18. The network device according to claim 15, wherein the network device is a core network device.

19. The network device according to claim 15, wherein the reference paging information further comprises any one or any combination of the following: the cell in which the user equipment is currently located or a neighboring cell list.

* * * * *